(12) United States Patent
Fukaya

(10) Patent No.: US 11,048,064 B2
(45) Date of Patent: *Jun. 29, 2021

(54) IMAGING LENS

(71) Applicant: KANTATSU CO., LTD., Yaita (JP)

(72) Inventor: Hisao Fukaya, Sukagawa (JP)

(73) Assignee: KANTATSU CO., LTD., Tochigi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/968,380

(22) Filed: May 1, 2018

(65) Prior Publication Data

US 2018/0246301 A1 Aug. 30, 2018

Related U.S. Application Data

(63) Continuation of application No. 15/456,038, filed on Mar. 10, 2017, which is a continuation of application
(Continued)

(30) Foreign Application Priority Data

Nov. 21, 2012 (JP) ................................ 2012-254881

(51) Int. Cl.
*G02B 9/62* (2006.01)
*G02B 13/00* (2006.01)
(Continued)

(52) U.S. Cl.
CPC ........... *G02B 13/0045* (2013.01); *G02B 9/64* (2013.01); *G02B 27/0025* (2013.01)

(58) Field of Classification Search
CPC ........ G02B 3/04; G02B 9/64; G02B 13/0045; G02B 13/18; G02B 27/0025; H04N 5/2254
(Continued)

(56) References Cited

U.S. PATENT DOCUMENTS 8,599,495 B1  12/2013 Tsai et al.
9,116,329 B2   8/2015 Fukaya
(Continued)

FOREIGN PATENT DOCUMENTS

JP   2007-264180 A   10/2007
JP   2011-085733 A    4/2011

OTHER PUBLICATIONS

May 17, 2018 Office Action Issued in U.S. Appl. No. 15/456,038.
(Continued)

*Primary Examiner* — Mahidere S Sahle
(74) *Attorney, Agent, or Firm* — Hamre, Schumann, Mueller & Larson, P.C.

(57) ABSTRACT

An imaging lens in which a positive first lens group, a positive second lens group, and a negative third lens group are arranged in order from the object side. The first lens group includes a positive first lens having a convex object-side surface and a second lens. The second lens group includes third and fourth lenses each having at least one aspheric surface. The third lens group includes a fifth lens, a sixth lens as a double-sided aspheric lens, and a seventh lens having a concave image-side surface near an optical axis. The lenses are not joined to each other, the seventh lens has an aspheric image-side surface whose shape changes from concave to convex as the distance from the optical axis increases, and an F-number is less than 1.8.

14 Claims, 22 Drawing Sheets

Related U.S. Application Data

No. 14/692,952, filed on Apr. 22, 2015, now Pat. No. 9,638,896, which is a continuation of application No. 14/028,627, filed on Sep. 17, 2013, now Pat. No. 9,116,329.

(51) Int. Cl.
  *G02B 9/64* (2006.01)
  *G02B 27/00* (2006.01)

(58) Field of Classification Search
  USPC .................................................. 359/642–830
  See application file for complete search history.

(56) References Cited

U.S. PATENT DOCUMENTS

| | | | |
|---|---|---|---|
| 2012/0044585 A1 | 2/2012 | Yamamoto | |
| 2014/0043694 A1* | 2/2014 | Tsai | ........................ G02B 3/04 |
| | | | 359/708 |

OTHER PUBLICATIONS

Dec. 4, 2018 Office Action issued in U.S. Appl. No. 15/456,038.
Aug. 29, 2019 Office Action issued in U.S. Appl. No. 15/456,038.
May 21, 2020 Office Action issued in U.S. Appl. No. 15/456,038.
Jan. 8, 2020 Office Action issued in U.S. Appl. No. 15/982,389.
Nov. 29, 2019 Office Action issued in U.S. Appl. No. 15/968,273.
Nov. 29, 2019 Office Action issued in U.S. Appl. No. 15/968,288.
Jul. 8, 2020 Office Action issued in U.S. Appl. No. 15/968,273.
Jul. 8, 2020 Office Action issued in U.S. Appl. No. 15/968,288.
Sep. 16, 2020 Office Action Issued in U.S. Appl. No. 15/982,389.

* cited by examiner

IMAGING LENS

CROSS REFERENCE TO RELATED APPLICATION

This application is a continuation of U.S. application Ser. No. 15/456,038, which in turn is a continuation of U.S. application Ser. No. 14/692,952, filed on Apr. 22, 2015, which is a continuation of U.S. application Ser. No. 14/028,627, filed on Sep. 17, 2013. The contents of both applications are incorporated herein by reference.

The present application is based on and claims priority of Japanese patent application No. 2012-254881 filed on Nov. 21, 2012, the entire contents of which are hereby incorporated by reference.

BACKGROUND OF THE INVENTION

Field of the Invention

The present invention relates to imaging lenses which form an image of an object on a solid-state image sensor such as a CCD sensor or C-MOS sensor used in a compact image pickup device and more particularly to imaging lenses which are built in image pickup devices mounted in mobile terminals such as smart phones and mobile phones, which are becoming increasingly compact and thin, and PDAs (Personal Digital Assistants), game consoles and information terminals such as PCs.

Description of the Related Art

In recent years, the market of tablet multifunctional terminals as typified by smart phones has been rapidly expanding. Today, mobile terminals which incorporate high-performance, high-quality cameras comparable to digital still cameras are becoming popular and high-pixel density cameras of over 8 megapixels are becoming mainstream. Since the trend towards high-pixel density cameras is expected to be accelerated, there is a growing demand for high-performance imaging lenses built in image pickup devices which cope with this trend. Furthermore, since portability and convenience are important for mobile terminals, there is a strong demand for thinner models. This accelerates the need for thinner image pickup device models and thinner imaging lenses built therein. At the same time, the imaging lenses are expected to ensure high brightness to cope with the increase in the number of pixels and provide a wide angle of view to capture an image of an object in a wider perspective.

In addition to many types of imaging lens composed of four lenses which have been proposed so far, imaging lenses composed of five or six lenses are proposed in order to meet the trend toward more compactness and thinness and higher performance.

For example, JP-A-2007-264180 (Patent Document 1) discloses an imaging lens which includes, in order from the object side, a positive first lens having a convex object-side surface, a negative meniscus second lens having a concave image-side surface, a positive meniscus third lens having a convex image-side surface, a negative fourth lens as a double-sided aspheric lens having a concave image-side surface near the optical axis, and a positive or negative fifth lens as a double-sided aspheric lens.

Also, JP-A-2011-085733 (Patent Document 2) discloses an imaging lens system which includes, in order from the object side, a first lens group including a first lens with a convex object-side surface, a second lens group including a second lens with a concave image-side surface, a third lens group including a meniscus third lens with a concave object-side surface, a fourth lens group including a meniscus fourth lens with a concave object-side surface, and a fifth lens group including a meniscus fifth lens with an aspheric object-side surface having an inflexion point, and an imaging lens composed of six lenses including a positive lens having a slightly convex surface on the object side of the above lens system and a slightly concave surface on its image side.

The imaging lens described in Patent Document 1, composed of five lenses, offers a high-performance imaging lens system which can correct axial chromatic aberration and chromatic aberration of magnification and copes with the increase in the number of pixels, by optimizing the lens material and lens surface shapes. However, its total track length is about 8 mm and there is difficulty in applying it to an increasingly thin image pickup device. Also, the F-number is about 2.8 and the angle of view is about 32 degrees, which is not sufficient to provide high brightness and a wide angle of view as expected in recent years.

Patent Document 2 discloses a high-resolution imaging lens which is relatively low-profile, in which the total track length of the five-lens type is about 6 mm and that of the six-lens type is about 6.6 mm. However, in this technique, the F-number is about 2.8 and the angle of view is about 32 degrees, so it is difficult to provide all the following features as expected in recent years: high resolution, low-profile design, high brightness, and a wide angle of view.

SUMMARY OF THE INVENTION

The present invention has been made in view of the above problem and an object thereof is to provide a low-cost imaging lens which can correct various aberrations properly in spite of a small F-number and is more low-profile than ever though it uses more lenses than ever to achieve higher performance and also offers a relatively wide angle of view.

The expression "low-profile" used herein means that the ratio of the imaging lens total track length (the distance on the optical axis from the lens surface nearest to the object to the image plane) to the diagonal length of the effective imaging plane of the image sensor (hereinafter referred to as "total track length to diagonal ratio") is less than 1.0, namely the imaging lens total track length is shorter than the diagonal length of the effective imaging plane. A high-brightness lens (fast lens) with a small F-number herein means that the lens has an F-number of less than 2.0 and the expression "wide angle of view" used herein means a total view angle of 70 degrees or more.

According to one aspect of the present invention, there is provided an imaging lens with a fixed focal length which forms an image of an object on a solid-state image sensor, in which lenses are arranged in the following order from an object side to an image side: a first lens group with positive refractive power, a second lens group with positive refractive power, and a third lens group with negative refractive power.

The first lens group includes a first lens with positive refractive power having a convex object-side surface and a second lens which are arranged in order from the object side. The second lens group includes a third lens and a fourth lens each having at least one aspheric surface which are arranged in order from the object side. The third lens group includes a fifth lens, a sixth lens as a double-sided aspheric lens, and a seventh lens having a concave image-side surface near an optical axis which are arranged in order from the object side.

The lenses are not joined to each other, the image-side surface of the seventh lens has an aspheric surface whose shape changes from concave to convex as the distance from the optical axis increases, and an F-number is less than 1.8.

Preferably, the second lens has negative refractive power and a concave image-side surface near the optical axis.

Preferably, the fifth lens has negative refractive power and a concave object-side surface near the optical axis.

Preferably, the sixth lens has positive refractive power and a convex image-side surface near the optical axis, and the seventh lens has negative refractive power.

In the above imaging lens, the first lens group, nearest to the object among the three lens groups, and the second lens group located on the image side of the first lens group have both positive refractive power while the third lens group, nearest to the image plane, has negative refractive power. This is virtually a telephoto configuration in which the image side principal point of the lens system can be easily moved toward the object. This refractive power arrangement is intended to shorten the total track length.

Since the first lens group is composed of the first lens with positive refractive power having a convex object-side surface and the second lens with negative refractive power having a concave image-side surface, chromatic aberration generated in the first lens is easily corrected by the second lens.

Preferably the first lens is a biconvex lens. If the object-side and image-side surfaces are both convex, both the surfaces share the burden of providing the required positive refractive power and thus the required refractive power can be obtained without the need for a smaller curvature radius than necessary. To decrease the refractive power of a lens surface is effective in lowering manufacturing error sensitivity.

Also, preferably the object-side surface of the second lens has a convex shape near the optical axis and is an aspheric surface whose positive refractive power decreases toward its periphery. If the object-side surface of the second lens is such an aspheric surface, the negative refractive power in the peripheral area can be strengthened so that the height of off-axial light rays can be controlled adequately. Consequently the distance between the first lens group and the second lens group can be shortened, which is advantageous for a low-profile design.

The second lens group is a combination of the third lens with positive or negative refractive power and the fourth lens with positive or negative refractive power and has a positive composite focal length. Since at least one surface of each of both the lenses is an aspheric surface, it is easy to properly correct spherical aberration, off-axial coma aberration and astigmatism which are generated in the first lens group.

The third lens may have a biconvex shape, meniscus shape or biconvex shape near the optical axis and the fourth lens may have a biconvex shape or meniscus shape with a convex object-side surface near the optical axis. If all the surfaces of the second lens group are aspheric, not only spherical aberration, coma aberration, and astigmatism but also chromatic aberration of magnification and distortion can be corrected more effectively. Furthermore, the distance between the first lens group and the third lens group can be shortened by adopting aspheric surfaces in which the thickness difference between the lens central area and peripheral area is small and the difference in the amount of sag among the surfaces is small.

The third lens group uses the fifth lens with negative refractive power, located nearest to the object in the group, to correct chromatic aberration generated in the second lens group and also uses its concave object-side surface to control the height of off-axial light rays adequately. In addition, the sixth lens has relatively strong positive refractive power to ensure a short total track length and the seventh lens with relatively strong negative refractive power having a concave image-side surface near the optical axis also ensures a short total track length while providing an adequate back focus.

If the sixth lens has a biconvex shape near the optical axis, strong positive refractive power is obtained, offering an advantage in shortening the total track length. If both the surfaces of the sixth lens are aspheric with their peripheral areas inclined toward the object, it is easy to suppress various aberrations and control the angle of principal light rays incident on the image sensor properly.

The image-side surface of the seventh lens has a concave shape near the optical axis, so it is easy to shorten the total track length. Also the surface is an aspheric surface whose shape changes from concave to convex as the distance from the optical axis increases, so it is easy to correct various aberrations at high image height and the angle of principal light rays incident on the image sensor can be properly controlled.

The seventh lens at least has a concave image-side surface near the optical axis and may be a biconcave lens or meniscus lens with a concave image-side surface. If it is a meniscus lens with a concave image-side surface, the object-side surface may be an aspheric surface whose shape changes from convex to concave as the distance from the optical axis increases so that various aberrations are corrected effectively.

Preferably the imaging lens according to the present invention satisfies the following conditional expressions (1) and (2):

$$45 < vd1 < 70 \quad (1)$$

$$20 < vd2 < 35 \quad (2)$$

where vd1: Abbe number of the first lens at d-ray, and vd2: Abbe number of the second lens at d-ray.

The conditional expression (1) defines an appropriate range of the Abbe number of the first lens and the conditional expression (2) defines an appropriate range of the Abbe number of the second lens and both the expressions indicate the conditions to correct chromatic aberration properly. If the value in the conditional expression (1) is below its lower limit and the value in the conditional expression (2) is above its upper limit, the difference in variance between the first lens and second lens would be small, resulting in insufficient correction of chromatic aberration. If the value in the conditional expression (1) is above its upper limit and the value in the conditional expression (2) is below its lower limit, the balance between axial chromatic aberration and chromatic aberration of magnification would worsen and the performance would deteriorate in the peripheral area.

More preferably the Abbe numbers of the first lens and second lens satisfy not only the above conditional expressions (1) and (2) but also the following conditional expression (3):

$$1.66 < vd1/vd2 < 2.66 \quad (3)$$

If they satisfy the conditional expression (3), chromatic aberration can be corrected more effectively.

Preferably the imaging lens according to the present invention satisfies the following conditional expressions (4) and (5):

$$20<vd5<35 \quad (4)$$

$$45<vd6<70 \quad (5)$$

where
vd5: Abbe number of the fifth lens at d-ray, and
vd6: Abbe number of the sixth lens at d-ray.

The conditional expression (4) defines an appropriate range of the Abbe number of the fifth lens and the conditional expression (5) defines an appropriate range of the Abbe number of the sixth lens. If the value in the conditional expression (4) is below its lower limit and the value in the conditional expression (5) is above its upper limit, the difference in variance between the fifth lens and sixth lens would be small, resulting in insufficient correction of chromatic aberration. If the value in the conditional expression (4) is above its upper limit and the value in the conditional expression (5) is below its lower limit, the balance between axial chromatic aberration and chromatic aberration of magnification would worsen and the performance would deteriorate in the peripheral area. The conditional expression (4) is also related to correction of chromatic aberration generated in the second lens group, located nearer to the object than the third lens group.

More preferably the Abbe numbers of the fifth lens and sixth lens satisfy not only the above conditional expressions (4) and (5) but also the following conditional expression (6):

$$1.66<vd6/vd5<2.66 \quad (6)$$

If they satisfy the conditional expression (6), chromatic aberration can be corrected more effectively.

Preferably the imaging lens according to the present invention satisfies the following conditional expressions (7) and (8):

$$0.62<f1/f<1.01 \quad (7)$$

$$-2.58<f2/f<-0.87 \quad (8)$$

where
f: focal length of the overall imaging lens system,
f1: focal length of the first lens, and
f2: focal length of the second lens.

The conditional expression (7) defines an appropriate range of the ratio of the focal length of the first lens to the focal length of the overall lens system. If the ratio in the conditional expression (7) is below its lower limit, the refractive power of the first lens would be strong relative to the refractive power of the overall lens system, unfavorably making aberration correction difficult and resulting in rise in manufacturing error sensitivity. If the ratio in the conditional expression (7) is above its upper limit, the refractive power of the first lens would be weak relative to the refractive power of the overall lens system, bringing a disadvantage in the achievement of a short total track length.

The conditional expression (8) defines an appropriate range of the ratio of the focal length of the second lens to the focal length of the overall lens system. If the ratio in the conditional expression (8) is below its lower limit, the refractive power of the second lens would be weak relative to the refractive power of the overall lens system, making it difficult to correct chromatic aberration. If the ratio in the conditional expression (8) is above its upper limit, the refractive power of the second lens would be strong relative to the refractive power of the overall lens system, making it difficult to correct spherical aberration and coma aberration.

In connection with the conditional expressions (7) and (8), it is more preferable that the following conditional expressions (7a) and (8a) be satisfied:

$$0.70<f1/f<0.93 \quad (7a)$$

$$-2.37<f2/f<-0.98 \quad (8a)$$

Preferably the imaging lens according to the present invention satisfies the following conditional expression (9):

$$0.96<f12/f<2.07 \quad (9)$$

where
f: focal length of the overall imaging lens system, and
f12: composite focal length of the first lens group.

The conditional expression (9) defines an appropriate range of the ratio of the composite focal length of the first and second lenses of the first lens group to the focal length of the overall lens system. If the ratio in the conditional expression (9) is below its lower limit, the positive refractive power of the first lens group would be strong relative to the refractive power of the overall lens system, offering an advantage in the achievement of a low-profile design but making it difficult to correct chromatic aberration. If the ratio in the conditional expression (9) is above its upper limit, the positive refractive power of the first lens group would be weak relative to the refractive power of the overall lens system, making it difficult to correct astigmatism and also bringing a disadvantage in the achievement of a low-profile design.

In connection with the conditional expression (9), it is more preferable that the following conditional expression (9a) be satisfied:

$$1.08<f12/f<1.90 \quad (9a)$$

Preferably the imaging lens according to the present invention satisfies the following conditional expression (10):

$$0.65<f12/f34<1.67 \quad (10)$$

where
f12: composite focal length of the first lens group, and
f34: composite focal length of the second lens group.

The conditional expression (10) defines an appropriate range of the ratio of the composite focal length of the first and second lenses of the first lens group to the composite focal length of the third and fourth lenses of the second lens group. If the ratio in the conditional expression (10) is below its lower limit, the refractive power of the first lens group would be strong relative to the refractive power of the second lens group, making it difficult to correct chromatic aberration. If the ratio in the conditional expression (10) is above its upper limit, the refractive power of the first lens group would be weak relative to the refractive power of the second lens group, making it difficult to correct coma aberration and astigmatism.

In connection with the conditional expression (10), it is more preferable that the following conditional expression (10a) be satisfied:

$$0.73<f12/f34<1.53 \quad (10a)$$

Preferably the imaging lens according to the present invention satisfies the following conditional expression (11):

$$-2.37<f567/f<-0.55 \quad (11)$$

where
f: focal length of the overall imaging lens system, and
f567: composite focal length of the third lens group.

The conditional expression (11) defines an appropriate range of the ratio of the composite focal length of the fifth, sixth, and seventh lenses of the third lens group to the focal length of the overall lens system. If the ratio in the conditional expression (11) is below its lower limit, the refractive power of the third lens group would be weak relative to the refractive power of the overall lens system, offering an advantage in the achievement of a short total track length but making it difficult to correct chromatic aberration. If the ratio in the conditional expression (11) is above its upper limit, the refractive power of the third lens group would be strong relative to the refractive power of the overall lens system, making it difficult to correct coma aberration and astigmatism.

In connection with the conditional expression (11), it is more preferable that the following conditional expression (11a) be satisfied:

$$-2.18 < f567/f < -0.62 \tag{11a}$$

Preferably the imaging lens according to the present invention satisfies the following conditional expression (12):

$$0.77 < TLA/2ih < 1.0 \tag{12}$$

where

TLA: distance on the optical axis from the object-side surface of the first lens to the image plane when the filter and the like are removed (total track length in air), and ih: maximum image height.

The conditional expression (12) defines an appropriate range of the total track length to diagonal ratio and indicates the condition to achieve a low-profile design. If the ratio in the conditional expression (12) is above its upper limit, the total track length of the imaging lens is longer than the length of the diagonal of the effective imaging plane of the image sensor, making it difficult to achieve a low-profile design. If the ratio is below its lower limit, the total track length would be too short for the constituent lenses to be arranged.

Preferably the imaging lens according to the present invention satisfies the following conditional expressions (13) and (14):

$$0.78 < \Sigma d/TLA < 0.85 \tag{13}$$

$$0.15 < bf/TLA < 0.22 \tag{14}$$

where

Σd: distance on the optical axis from the object-side surface of the first lens to the image-side surface of the seventh lens, and bf: distance on the optical axis from the image-side surface of the seventh lens to the image plane when the filter and the like are removed (back focus).

The conditional expressions (13) and (14) define an appropriate relation between the space for the arrangement of the constituent lenses and the back focus, using their ratios to the total track length. If the ratio in the conditional expression (13) is above its upper limit and the ratio in the conditional expression (14) is below its lower limit, the back focus would be too short to obtain space for the arrangement of an IR cut filter and the like. If the ratio in the conditional expression (13) is below its lower limit and the ratio in the conditional expression (14) is above its upper limit, it would be easy to obtain an adequate back focus but it would be difficult to improve the performance because the available space for the constituent lenses is decreased and the design freedom of lens shapes including aspheric shapes is restricted.

Preferably, in the imaging lens according to the present invention, an aperture stop is located between the first and second lenses or on the object side of the first lens. When the aperture stop is located nearer to the object in the lens system, the exit pupil can be remoter from the image plane and the angle of incidence on the image sensor of light rays focused on the peripheral area of the image plane can be controlled more easily.

The imaging lens according to the present invention provides brightness with an F-number of less than 2.0 and more specifically, it provides very high brightness (1.6≤Fno≤1.8).

Generally, the smaller the F-number is, the larger the entrance pupil diameter or lens effective diameter is and the larger the incident luminous flux diameter is. It implies that spherical aberration increases and particularly various aberrations of off-axial light rays increase. Therefore, when the F-number is smaller, more means must be provided to correct the increased aberrations. In the present invention, three lens groups or seven lenses are provided and each lens group and the constituent lenses of each lens group are designed to have optimum refractive power respectively and adequate aspheric surfaces are formed on all the lens surfaces so that the lens system can correct aberrations properly though the F-number is small.

If high brightness as mentioned above is not required, the entrance pupil diameter may be smaller to reduce the required lens diameter or similar high performance can be achieved without making all the lens surfaces have aspheric surfaces.

According to another aspect of the present invention, the imaging lens composed of seven lens elements in three lens groups with a fixed focal length which forms an image of an object on a solid-state image sensor, in which lenses are arranged in order from an object side to an image side, may have: a first lens group including two lens elements; a second lens group including two lens elements; and a third lens group including three lens elements. The first lens group includes a first lens with positive refractive power having a convex object-side surface and a second lens which are arranged in order from the object side. The second lens group includes a third lens and a fourth lens each having at least one aspheric surface which are arranged in order from the object side. The third lens group includes a fifth lens, a sixth lens as a double-sided aspheric lens, and a seventh lens having a concave image-side surface near an optical axis which are arranged in order from the object side. The lenses are not joined to each other, the image-side surface of the seventh lens has an aspheric surface whose shape changes from concave to convex as a distance from the optical axis increases, and satisfies the following conditional expressions (7) and (8b):

$$0.62 < f1/f < 1.01 \tag{7}$$

$$-1.4821 \leq f2/f < -0.87 \tag{8b}$$

where f: focal length of the overall imaging lens system, f1: focal length of the first lens, and f2: focal length of the second lens.

According to the above configuration, the imaging lens composed of seven lenses in three lens groups has more low-profile design than ever though it uses more lenses than ever to achieve higher performance, and also offers a relatively wide angle of view.

Furthermore, preferably all the constituent lenses of the imaging lens according to the present invention are made of plastic material. The use of plastic material for all the constituent lenses makes it possible to mass-produce the imaging lens at low cost, for example, by injection molding.

DETAILED DESCRIPTION OF THE PREFERRED EMBODIMENTS

Next, the preferred embodiments of the present invention will be described in detail referring to the accompanying drawings. FIGS. 1, 3, 5, 7, 9, 11, 13, 15, 17, 19, and 21 are schematic views showing the general configurations of the imaging lenses according to Embodiments 1 to 11 of the present invention respectively. Since all these embodiments have almost the same basic lens configuration, a general explanation of the lens configuration of an imaging lens according to the present invention is given below referring to the schematic view of Embodiment 1.

Figure 1:
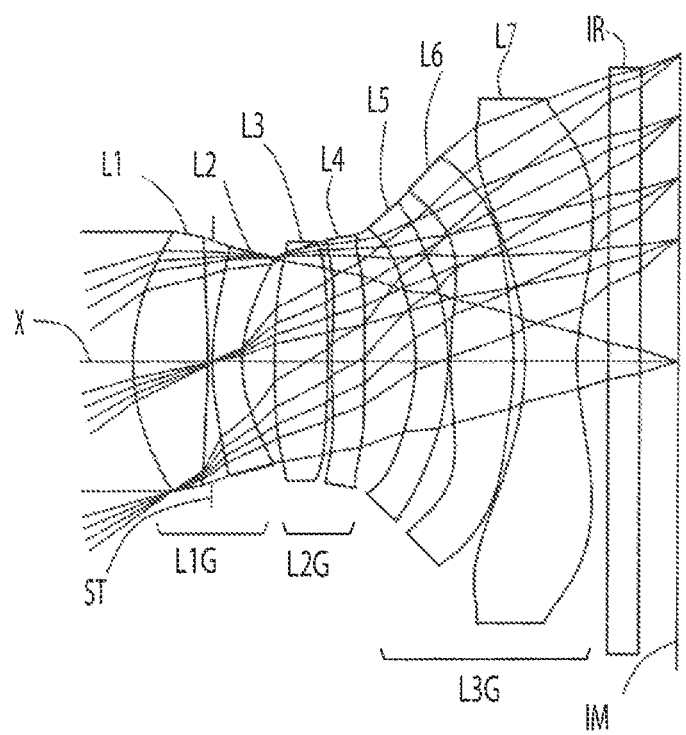
FIG. 1 is a schematic view showing the general configuration of an imaging lens according to Embodiment 1 of the invention.

As shown in FIG. 1, in the imaging lens according to Embodiment 1, lenses are arranged in the following order from the object side to the image side: a first lens group L1G with positive refractive power composed of two lenses, a second lens group L2G with positive refractive power composed of two lenses, and a third lens group L3G with negative refractive power composed of three lenses.

In the above imaging lens composed of three lens groups (seven lenses), the first lens group L1G includes a biconvex first lens L1 in which the object-side and image aide surfaces are both convex, and a meniscus second lens L2 with negative refractive power having a convex object-side surface and a concave image-side surface near the optical axis X, and the first lens group L1G has positive refractive power.

The object-side convex surface of the second lens L2 is an aspheric surface in which the positive refractive power weakens as the distance from the optical axis X increases.

An aperture stop ST is located between the first lens L1 and the second lens L2.

The second lens group L2G includes a biconvex third lens L3 in which the object-side and image side surfaces are both convex near the optical axis X, and a meniscus fourth lens L4 with positive refractive power having a convex object-side surface and a concave image-side surface near the optical axis X, and the second lens group L2G has positive refractive power. Both the surfaces of the third lens L3 and fourth lens L4 have aspheric surfaces.

The third lens group L3G includes a meniscus fifth lens L5 with negative refractive power having a concave object-side surface and a convex image-side surface near the optical axis X, a sixth lens L6 in which the object-side and image-side surfaces are both convex near the optical axis X, and a seventh lens L7 in which the object-side surface and image-side surface are both concave, and the third lens group L3G has negative refractive power. The image-side surface of the seventh lens L7 has an aspheric surface whose shape changes from concave to convex in the direction toward the periphery.

As mentioned above, the positive first lens group L1G, positive second lens group L2G, and negative third lens group L3G are arranged in order from the object side so as to make up a so-called telephoto lens configuration and move the principal point on the image side to the object side to shorten the total track length.

The first lens group L1G uses the negative second lens L2 effectively to correct chromatic aberration generated in the positive first lens L1.

The second lens group L2G is mainly responsible for correction of spherical aberration, coma aberration, and astigmatism and its positive refractive power is almost equal to the positive refractive power of the first lens group L1G. The positive refractive power of the first lens group L1G and that of the second lens group L2G are weak relative to the refractive power of the total optical system of the imaging lens. Due to this refractive power distribution, the refractive power of each lens surface can be weakened and a surface with high error sensitivity can be eliminated, thereby contributing to manufacturing ease. In addition, the object-side surface of the fourth lens L4 is convex and its positive refractive power decreases in the direction toward the periphery and an aspheric surface whose shape changes from convex to concave is formed in its peripheral area. This aspheric surface is used effectively to correct off-axial coma aberration and astigmatism.

The third lens group L3G corrects chromatic aberration generated in the second lens group L2G by using the fifth lens L5 with negative refractive power having a concave object-side surface, located nearest to the object in the group, and also controls the height of off-axial light rays properly by using the concave object-side surface. The sixth lens L6 has a biconvex shape near the optical axis X and its positive refractive power is relatively strong and the seventh lens L7, which has a biconcave shape near the optical axis and has relatively strong negative refractive power, is located on the image side of the sixth lens L6, so that the total track length is shortened and off-axial aberration is corrected by the aspheric image-side surface of the seventh lens L7 and the angle of principal light rays incident on the image sensor is controlled not to be larger than necessary.

Although the composite refractive index of the second lens group L2G should be positive, it does not matter whether the constituent third lens L3 and fourth lens L4 each have positive or negative refractive power. As far as the lens shapes are concerned, the third lens L3 may have a biconvex shape or meniscus shape near the optical axis X and the fourth lens L4 may have a biconvex shape or meniscus shape with a convex object-side surface near the optical axis X. The seventh lens L7 may have a convex object-side surface near the optical axis X and if that is the case, it is desirable that an aspheric surface whose shape changes from convex to concave in the direction toward the periphery be formed. The refractive power and surface shapes of the second lens group L2G and the surface shapes of the seventh lens L7 are not limited to those in Embodiment 1. Embodiments 2 to 11 which will be described later offer various numerical examples, suggesting that the invention allows a wide variety of modifications.

The location of the aperture stop ST is not limited to between the first lens L1 and the second lens L2, instead it may be located on the object side of the first lens L1. When it is nearer to the object, the exit pupil can be remoter from the image plane and the angle of principal rays incident on the image sensor can be controlled more easily.

Also, all the constituent lenses of the imaging lens according to the present invention are made of plastic material. Therefore the imaging lens can be mass-produced at low cost. In the present invention, the negative refractive power second lens L2 of the first lens group L1G and the negative refractive power fifth lens L5 of the third lens group L3G are made of high-dispersion material and the other lenses (first lens L1, third lens L3, fourth lens L4, sixth lens L6, and seventh lens L7) are made of low-dispersion material so that chromatic aberration can be corrected properly.

The imaging lens according to the present invention satisfies the following conditional expressions:

$$45 < vd1 < 70 \tag{1}$$

$$20 < vd2 < 35 \tag{2}$$

$$1.66 < vd1/vd2 < 2.66 \tag{3}$$

$$20 < vd5 < 35 \tag{4}$$

$$45 < vd6 < 70 \tag{5}$$

$$1.66 < vd6/vd5 < 2.66 \tag{6}$$

$$0.62 < f1/f < 1.01 \tag{7}$$

$$-2.58 < f2/f < -0.87 \tag{8}$$

$$0.96 < f12/f < 2.07 \tag{9}$$

$$0.65 < f12/f34 < 1.67 \tag{10}$$

$$-2.37 < f567/f < -0.55 \tag{11}$$

$$0.77 < TLA/(2ih) < 1.0 \tag{12}$$

$$0.78 < \Sigma d/TLA < 0.85 \tag{13}$$

$$0.15 < bf/TLA < 0.22 \tag{14}$$

where
  vd1: Abbe number of the first lens L1 at d-dray,
  vd2: Abbe number of the second lens L2 at d-dray,
  vd5: Abbe number of the fifth lens L5 at d-dray,
  vd6: Abbe number of the sixth lens L6 at d-dray,
  f: focal length of the overall imaging lens system,
  f1: focal length of the first lens L1,
  f2: focal length of the second lens L2,
  f12: composite focal length of the first lens group L1G,
  f34: composite focal length of the second lens group L2G,
  f567: composite focal length of the third lens group L3G,
  TLA: distance on the optical axis from the object-side surface of the first lens L1 to the image plane when the filter and the like are removed (total track length),
  ih: maximum image height,
  $\Sigma d$: distance on the optical axis from the object-side surface of the first lens L1 to the image-side surface of the seventh lens L7, and
  bf: distance on the optical axis from the image-side surface of the seventh lens L7 to the image plane when the filter and the like are removed (back focus).

In the embodiments, all the lens surfaces are aspheric and the aspheric shapes of these lens surfaces are expressed by the following equation, where Z represents an axis in the optical axis direction, R represents height perpendicular to the optical axis, k represents conic constant, and A4, A6, A8, A10, A12, A14, and A16 represent aspheric surface coefficients.

Equation 1

$$Z = \frac{\frac{H^2}{R}}{1 + \sqrt{1 - (k+1)\frac{H^2}{R^3}}} + A_2 H^2 + A_6 H^6 + A_8 H^8 + A_{10} H^{10} + A_{12} H^{12} A_{14} H^{14} + A_{16} H^{16}$$

Next, the imaging lenses according to the embodiments of the present invention will be explained. In each embodiment, f represents the focal length of the overall imaging lens system, Fno represents F-number, ω represents half angle of view, and ih represents maximum image height. i represents a surface number counted from the object side, r represents curvature radius, d represents the distance between lens surfaces on the optical axis (surface distance), Nd represents refractive index with respect to d-ray (reference wavelength), and vd represents Abbe number with respect to d-ray. As for aspheric surfaces, an asterisk (*) after surface number i indicates that the surface concerned is an aspheric surface.

Embodiment 1

The basic lens data of Embodiment 1 is shown below in Table 1.

TABLE 1

Numerical Example 1
in mm $f = 4.06$
$Fno = 1.64$
$\omega \text{ (deg)} = 35.49$
$ih = 2.934$ Surface Data

| Surface No. 1 | Curvature Radius r | Surface Distance d | Refractive Index Nd | Abbe Number vd |
|---|---|---|---|---|
| (Object Plane) | Infinity | Infinity | | |
| 1* | 2.120 | 0.706 | 1.535 | 56.16 |
| 2* | −8.388 | 0.045 | | |
| Stop | Infinity | 0.000 | | |
| 3* | 2.328 | 0.280 | 1.635 | 23.91 |
| 4* | 1.271 | 0.304 | | |
| 5* | 11.499 | 0.488 | 1.535 | 56.16 |
| 6* | −14.778 | 0.040 | | |
| 7* | 7.147 | 0.300 | 1.535 | 56.16 |
| 8* | 279.233 | 0.479 | | |
| 9* | −1.724 | 0.308 | 1.635 | 23.91 |
| 10* | −2.451 | 0.025 | | |
| 11* | 3.281 | 0.603 | 1.535 | 56.16 |
| 12* | −2.276 | 0.106 | | |
| 13* | −2.768 | 0.500 | 1.535 | 56.16 |
| 14* | 1.939 | 0.150 | | |
| 15 | Infinity | 0.300 | 1.517 | 64.20 |
| Image Plane | Infinity | 0.517 | | |

Aspheric Surface Data

| | 1st Surface | 2nd Surface | 3rd Surface | 4th Surface | 5th Surface | 6th Surface | 7th Surface |
|---|---|---|---|---|---|---|---|
| k | −2.613E−01 | 0.000E+00 | −1.337E+01 | −3.683E+00 | 4.183E+01 | 0.000E+00 | 0.000E+00 |
| A4 | 3.254E−03 | 4.130E−02 | −9.523E−03 | 8.580E−04 | 6.036E−02 | −1.033E−02 | −9.734E−02 |
| A6 | −5.108E−04 | −1.584E−02 | −1.837E−02 | 1.710E−03 | −2.284E−02 | −1.354E−02 | −2.892E−02 |
| A8 | −3.395E−03 | −3.810E−03 | 2.118E−02 | 2.506E−02 | 2.337E−02 | 7.724E−02 | 3.955E−03 |
| A10 | −1.192E−03 | 4.403E−03 | −2.901E−03 | −2.479E−02 | −3.673E−02 | −8.876E−03 | 3.914E−02 |
| A12 | 2.923E−03 | 7.487E−04 | −3.172E−03 | 8.752E−03 | 2.799E−02 | −7.400E−03 | −1.458E−02 |
| A14 | −1.263E−03 | −1.296E−03 | 4.167E−04 | 3.157E−04 | −1.073E−02 | −8.861E−12 | 1.587E−11 |
| A16 | 0.000E+00 | 0.000E+00 | 5.039E−07 | −5.850E−08 | −8.096E−06 | −6.139E−13 | 9.787E−13 |

| | 8th Surface | 9th Surface | 10th Surface | 11th Surface | 12th Surface | 13th Surface | 14th Surface |
|---|---|---|---|---|---|---|---|
| k | 0.000E+00 | 7.240E−01 | −1.804E+00 | −1.321E+01 | −2.578E+01 | −3.711E+00 | −1.822E+01 |
| A4 | −4.140E−02 | 2.245E−01 | −1.129E−02 | −9.798E−02 | 5.301E−02 | −2.617E−03 | −3.214E−02 |
| A6 | −4.822E−02 | −1.627E−01 | 1.408E−02 | 2.567E−02 | −4.127E−02 | 1.485E−03 | 5.137E−03 |
| A8 | −3.177E−03 | 8.516E−02 | −7.161E−03 | −1.845E−02 | 3.896E−03 | 1.225E−04 | −7.897E−04 |
| A10 | 4.302E−02 | −1.878E−02 | −2.788E−04 | 1.269E−03 | 1.419E−03 | 3.748E−05 | −1.132E−05 |
| A12 | −1.925E−02 | −3.120E−03 | 4.709E−04 | 8.921E−04 | −2.734E−04 | −2.633E−06 | 4.631E−06 |
| A14 | 5.573E−03 | 2.386E−03 | 0.000E+00 | 0.000E+00 | 0.000E+00 | −1.777E−06 | 6.438E−07 |
| A16 | 2.179E−06 | 0.000E+00 | 0.000E+00 | 0.000E+00 | 0.000E+00 | 1.876E−07 | −4.667E−09 |

Constituent Lens Data

| Lens | Start Surface | Focal Length |
|---|---|---|
| 1 | 1 | 3.241 |
| 2 | 3 | −4.915 |
| 3 | 5 | 12.175 |
| 4 | 7 | 13.714 |
| 5 | 9 | −10.937 |
| 6 | 11 | 2.615 |
| 7 | 13 | −2.057 |

TABLE 1-continued

| Lens Group Data | | |
|---|---|---|
| L1G | f12 | 6.334 |
| L2G | f34 | 6.503 |
| L3G | f567 | −7.595 |

As shown in Table 12, the imaging lens in Embodiment 1 satisfies all the conditional expressions (1) to (14).

Figure 2:
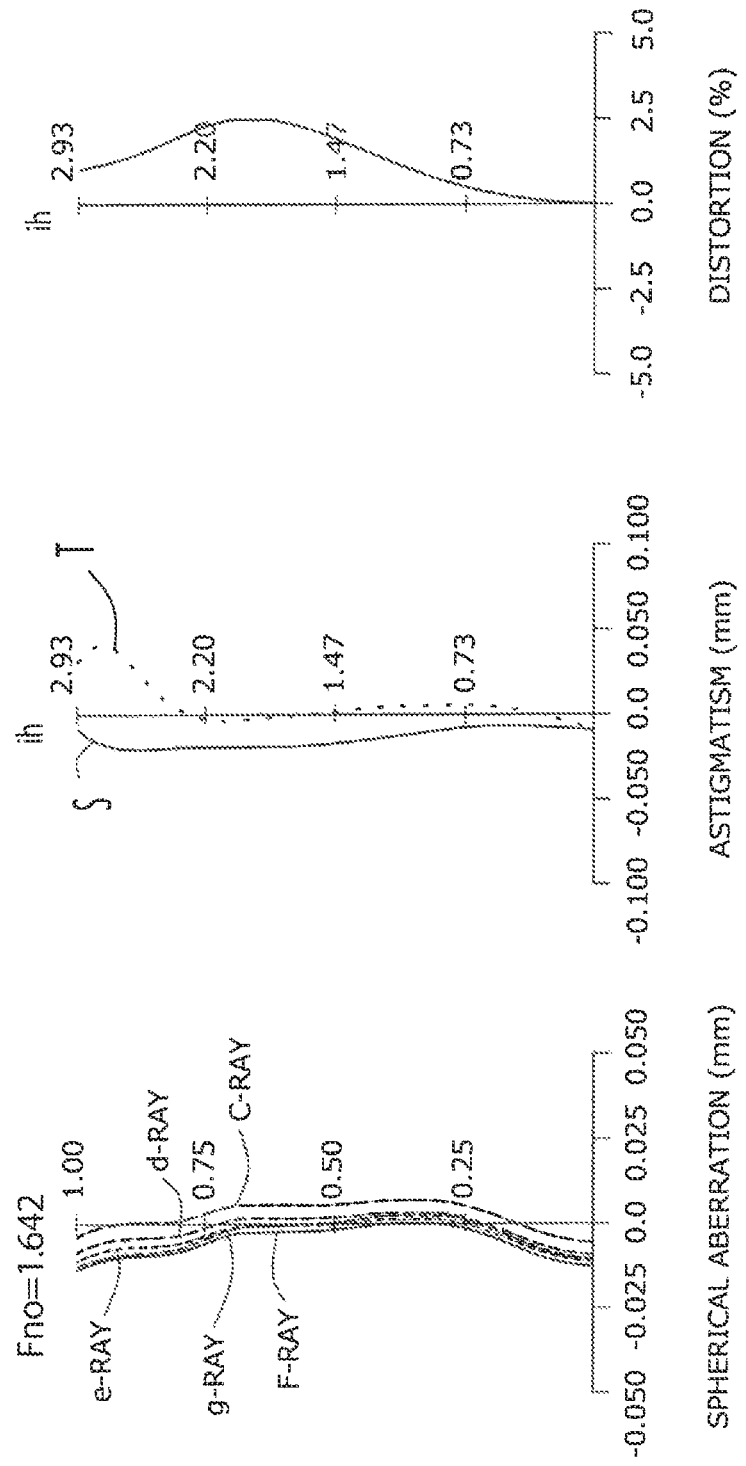
FIG. 2 shows spherical aberration, astigmatism and distortion of the imaging lens according to Embodiment 1.
Figure 3:
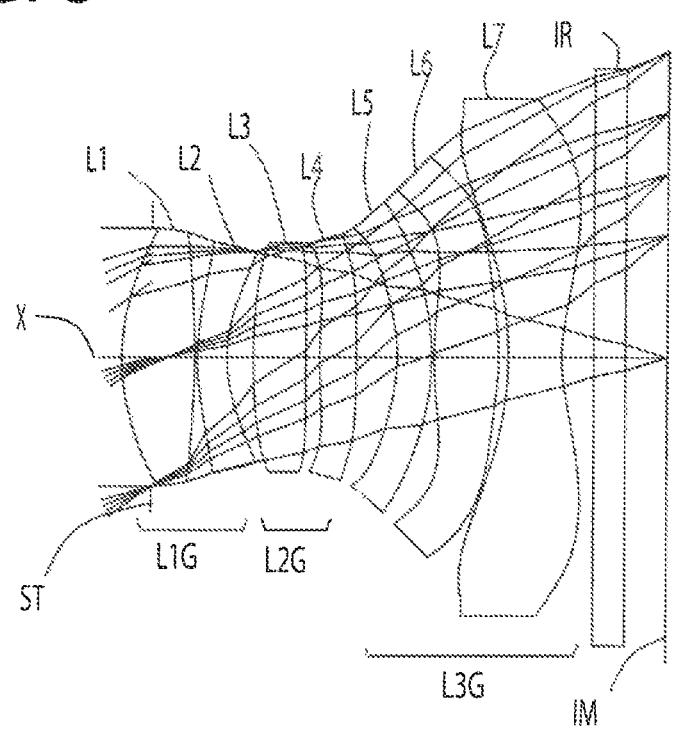
FIG. 3 is a schematic view showing the general configuration of an imaging lens according to Embodiment 2 of the invention.

FIG. 2 shows spherical aberration (mm), astigmatism (mm), and distortion (%) of the imaging lens in Embodiment 1. The spherical aberration diagram shows the amount of aberration at wavelengths of g-ray (436 nm), F-ray (486 nm), e-ray (546 nm), d-ray (588 nm), and C-ray (656 nm). The astigmatism diagram shows the amount of aberration on sagittal image surface S and the amount of aberration on tangential image surface T. (These explanations of the aberration diagrams are applicable to Embodiments 2 to 11 which will be described later.) As FIG. 2 indicates, aberrations are properly corrected.

Embodiment 2

The basic lens data of Embodiment 2 is shown below in Table 2.

TABLE 2

Numerical Example 2
in mm f = 4.05
Fno = 1.64
ω (deg) = 35.64
ih = 2.934

| Surface No. 1 | Curvature Radius r | Surface Distance d | Refractive Index Nd | Abbe Number νd |
|---|---|---|---|---|
| (Object Plane) | Infinity | Infinity | | |
| Stop | Infinity | −0.28 | | |
| 1* | 2.2252 | 0.687 | 1.535 | 56.16 |
| 2* | −7.402 | 0.026 | | |
| 3* | 2.350 | 0.280 | 1.635 | 23.91 |
| 4* | 1.319 | 0.258 | | |
| 5* | 7.691 | 0.499 | 1.535 | 56.16 |
| 6* | 38.675 | 0.135 | | |
| 7* | 5.597 | 0.345 | 1.535 | 56.16 |
| 8* | −161.334 | 0.393 | | |
| 9* | −1.671 | 0.324 | 1.635 | 23.91 |
| 10* | −2.384 | 0.025 | | |
| 11* | 3.285 | 0.597 | 1.535 | 56.16 |
| 12* | −2.381 | 0.092 | | |
| 13* | −3.243 | 0.500 | 1.535 | 56.16 |
| 14* | 1.764 | 0.200 | | |
| 15 | Infinity | 0.300 | 1.517 | 64.20 |
| Image Plane | Infinity | 0.491 | | |

Aspheric Surface Data

| | 1st Surface | 2nd Surface | 3rd Surface | 4th Surface | 5th Surface | 6th Surface | 7th Surface |
|---|---|---|---|---|---|---|---|
| k | −3.224E−01 | 0.000E+00 | −1.410E+01 | −3.794E+00 | 1.803E+01 | 0.000E+00 | 0.000E+00 |
| A4 | 3.360E−03 | 3.552E−02 | −9.091E−03 | −7.625E−03 | 5.314E−02 | −2.666E−02 | −1.118E−01 |
| A6 | −8.460E−03 | −1.679E−02 | −2.136E−02 | −7.935E−03 | −2.481E−02 | −1.773E−02 | −3.708E−02 |
| A8 | 4.952E−04 | −1.572E−03 | 2.404E−02 | 3.938E−02 | 3.264E−02 | 2.145E−02 | −8.888E−03 |
| A10 | −2.249E−03 | 1.713E−03 | −4.435E−03 | −3.624E−02 | −3.619E−02 | −1.122E−02 | 3.315E−02 |
| A12 | 2.723E−03 | 1.828E−03 | −3.965E−03 | 8.752E−03 | 2.799E−02 | −7.501E−03 | −1.488E−02 |
| A14 | −1.335E−03 | −1.635E−03 | 4.167E−04 | 3.157E−04 | −1.073E−02 | −8.946E−12 | 1.604E−11 |
| A16 | 0.000E+00 | 0.000E+00 | 5.039E−07 | −5.850E−08 | −8.096E−06 | −6.121E−13 | 9.905E−13 |

| | 8th Surface | 9th Surface | 10th Surface | 11th Surface | 12th Surface | 13th Surface | 14th Surface |
|---|---|---|---|---|---|---|---|
| k | 0.000E+00 | 7.274E−01 | −2.177E+00 | −1.240E+01 | −2.953E+01 | −2.652E+00 | −1.482E+01 |
| A4 | −4.597E−02 | 2.315E−01 | −6.352E−03 | −9.851E−02 | 5.281E−02 | −3.260E−03 | −3.346E−02 |
| A6 | −6.003E−02 | −1.665E−01 | 1.404E−02 | 2.760E−02 | −4.036E−02 | 1.521E−03 | 5.291E−03 |
| A8 | −6.997E−03 | 8.268E−02 | −7.531E−03 | −1.871E−02 | 3.631E−02 | 1.420E−04 | −7.542E−04 |
| A10 | 4.383E−02 | −1.296E−02 | −3.198E−04 | 1.030E−03 | 1.343E−03 | 4.031E−05 | −9.129E−06 |
| A12 | −1.933E−02 | −3.120E−03 | 3.894E−04 | 8.713E−04 | −2.607E−04 | −2.131E−06 | 4.400E−06 |
| A14 | 5.573E−03 | 2.388E−03 | 0.000E+00 | 0.000E+00 | 0.000E+00 | −1.863E−06 | 5.875E−07 |
| A16 | 2.179E−06 | 0.000E+00 | 0.000E+00 | 0.000E+00 | 0.000E+00 | 1.773E−07 | −1.285E−08 |

TABLE 2-continued

| Consituent Lens Data | | |
|---|---|---|
| Lens | Start Surface | Focal Length |
| 1 | 1 | 3.282 |
| 2 | 3 | −5.284 |
| 3 | 5 | 17.856 |
| 4 | 7 | 10.125 |
| 5 | 9 | −10.955 |
| 6 | 11 | 2.681 |
| 7 | 13 | −2.065 |

| Lens Group Data | | |
|---|---|---|
| L1G | f12 | 6.156 |
| L2G | f34 | 6.590 |
| L3G | f567 | −7.054 |

As shown in Table 12, the imaging lens in Embodiment 2 satisfies all the conditional expressions (1) to (14).

Figure 4:
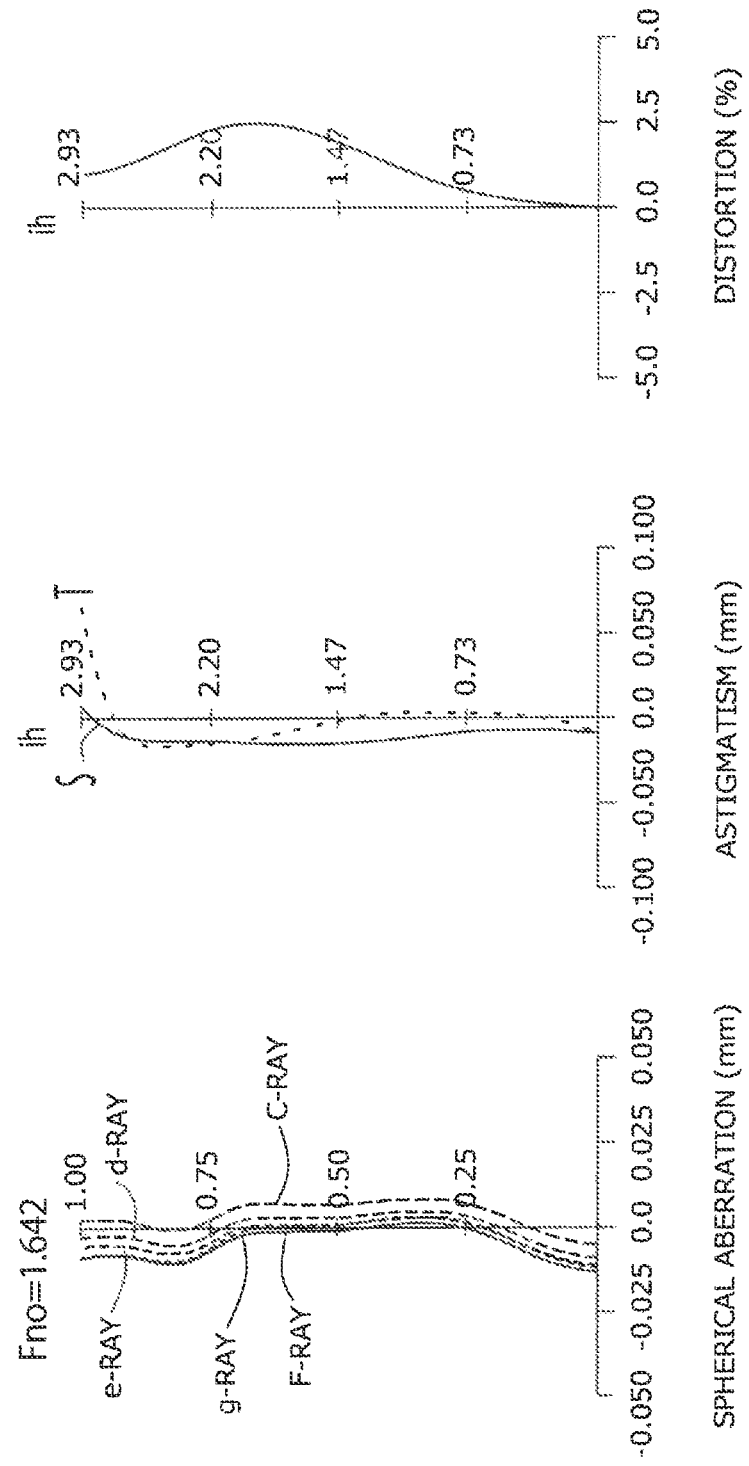
FIG. 4 shows spherical aberration, astigmatism and distortion of the imaging lens according to Embodiment 2.
Figure 5:
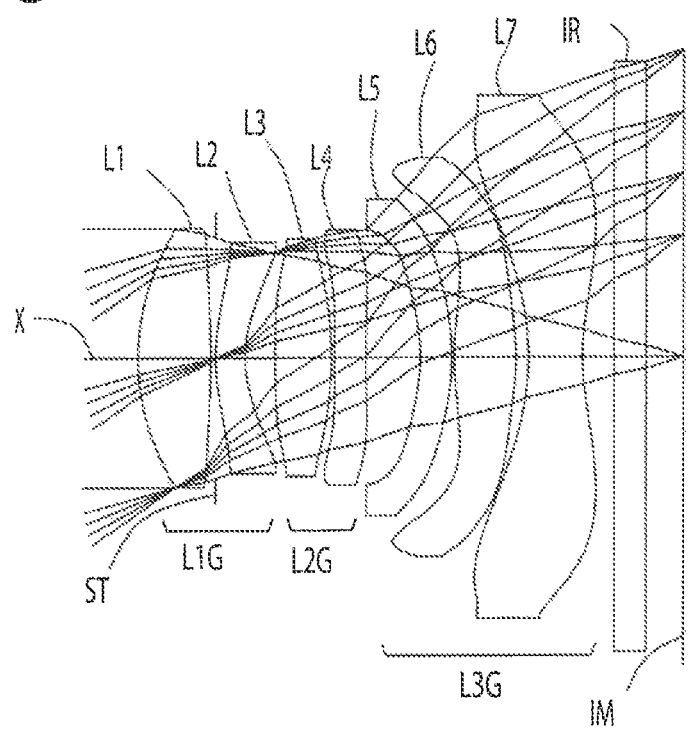
FIG. 5 is a schematic view showing the general configuration of an imaging lens according to Embodiment 3 of the invention.

FIG. 4 shows aberrations of the imaging lens in Embodiment 2. As FIG. 4 indicates, aberrations are properly corrected.

Embodiment 3

The basic lens data of Embodiment 3 is shown below in Table 3.

TABLE 3

Numerical Example 3
in mm $f = 4.07$
$Fno = 1.64$
$\omega$ (deg) = 35.49
$ih = 2.934$

| Surface Data | | | | |
|---|---|---|---|---|
| Surface No. 1 | Curvature Radius r | Surface Distance d | Refractive Index Nd | Abbe Number vd |
| (Object Plane) | Infinity | Infinity | | |
| 1* | 2.2744 | 0.684 | 1.535 | 56.16 |
| 2* | −7.158 | 0.046 | | |
| Stop | Infinity | 0.000 | | |
| 3* | 2.124 | 0.280 | 1.635 | 23.91 |
| 4* | 1.202 | 0.290 | | |
| 5* | 12.679 | 0.539 | 1.535 | 56.16 |
| 6* | −3.643 | 0.030 | | |
| 7* | 21.213 | 0.300 | 1.535 | 56.16 |
| 8* | 9.110 | 0.520 | | |
| 9* | −1.747 | 0.300 | 1.635 | 23.91 |
| 10* | −2.476 | 0.025 | | |
| 11* | 3.108 | 0.572 | 1.535 | 56.16 |
| 12* | −2.443 | 0.118 | | |
| 13* | −2.582 | 0.500 | 1.535 | 56.16 |
| 14* | 2.098 | 0.150 | | |
| 15 | Infinity | 0.300 | 1.517 | 64.20 |
| Image Plane | Infinity | 0.495 | | |

| Aspheric Surface Data | | | | | | | |
|---|---|---|---|---|---|---|---|
| | 1st Surface | 2nd Surface | 3rd Surface | 4th Surface | 5th Surface | 6th Surface | 7th Surface |
| k | −2.650E−01 | 0.000E+00 | −1.004E+01 | −3.488E+00 | 9.900E+01 | 0.000E+00 | 0.000E+00 |
| A4 | 2.045E−03 | 5.656E−02 | −1.778E−02 | −5.991E−03 | 6.906E−02 | 1.077E−03 | −1.121E−01 |
| A6 | 2.534E−03 | −3.317E−02 | −3.146E−02 | −1.073E−02 | −2.159E−02 | −8.057E−03 | −4.663E−02 |
| A8 | −6.022E−03 | 3.803E−03 | 2.480E−02 | 1.748E−02 | 3.366E−02 | −1.037E−02 | 1.618E−02 |
| A10 | 6.657E−05 | 1.036E−02 | −1.311E−02 | −3.230E−02 | −5.239E−02 | 3.012E−02 | 4.921E−02 |
| A12 | 3.009E−03 | −8.273E−03 | 2.940E−03 | 8.910E−03 | 2.772E−02 | −7.013E−03 | −1.260E−02 |
| A14 | −1.531E−03 | 1.516E−03 | 3.342E−04 | 3.157E−04 | −1.073E−02 | −5.714E−04 | −3.013E−04 |
| A16 | 0.000E+00 | 0.000E+00 | 5.039E−07 | −5.851E−08 | −8.096E−06 | −1.289E−11 | 1.431E−11 |
| | 8th Surface | 9th Surface | 10th Surface | 11th Surface | 12th Surface | 13th Surface | 14th Surface |
| k | 0.000E+00 | 1.043E+00 | −3.594E+00 | −2.156E+00 | −3.090E+01 | −3.599E+00 | −2.112E+01 |
| A4 | −6.010E−02 | 2.751E−01 | 3.911E−03 | −1.322E−01 | 5.089E−02 | −2.570E−03 | −3.362E−02 |

TABLE 3-continued

| | | | | | | | |
|---|---|---|---|---|---|---|---|
| A6 | −5.881E−02 | −1.725E−01 | 1.436E−02 | 2.969E−02 | −4.546E−02 | 1.486E−03 | 5.100E−03 |
| A8 | 1.754E−02 | 6.898E−02 | −1.741E−02 | −1.647E−02 | 5.108E−03 | 1.337E−04 | −8.027E−04 |
| A10 | 3.069E−02 | −1.558E−02 | −2.167E−03 | −8.692E−04 | 1.510E−03 | 3.647E−05 | −1.479E−05 |
| A12 | −2.269E−02 | −3.256E−03 | 1.929E−03 | 1.222E−03 | −3.246E−04 | −1.753E−06 | 3.377E−06 |
| A14 | 5.439E−03 | 2.575E−03 | 0.000E+00 | 0.000E+00 | 0.000E+00 | −1.906E−06 | 6.186E−07 |
| A16 | 2.179E−06 | 0.000E+00 | 0.000E+00 | 0.000E+00 | 0.000E+00 | 1.962E−07 | −5.302E−08 |

Consituent Lens Data

| Lens | Start Surface | Focal Length |
|---|---|---|
| 1 | 1 | 3.312 |
| 2 | 3 | −4.943 |
| 3 | 5 | 5.355 |
| 4 | 7 | −30.127 |
| 5 | 9 | −11.123 |
| 6 | 11 | 2.653 |
| 7 | 13 | −2.087 |

Lens Group Data

| | | |
|---|---|---|
| L1G | f12 | 6.628 |
| L2G | f34 | 6.395 |
| L3G | f567 | −7.671 |

As shown in Table 12, the imaging lens in Embodiment 3 satisfies all the conditional expressions (1) to (14).

Figure 6:
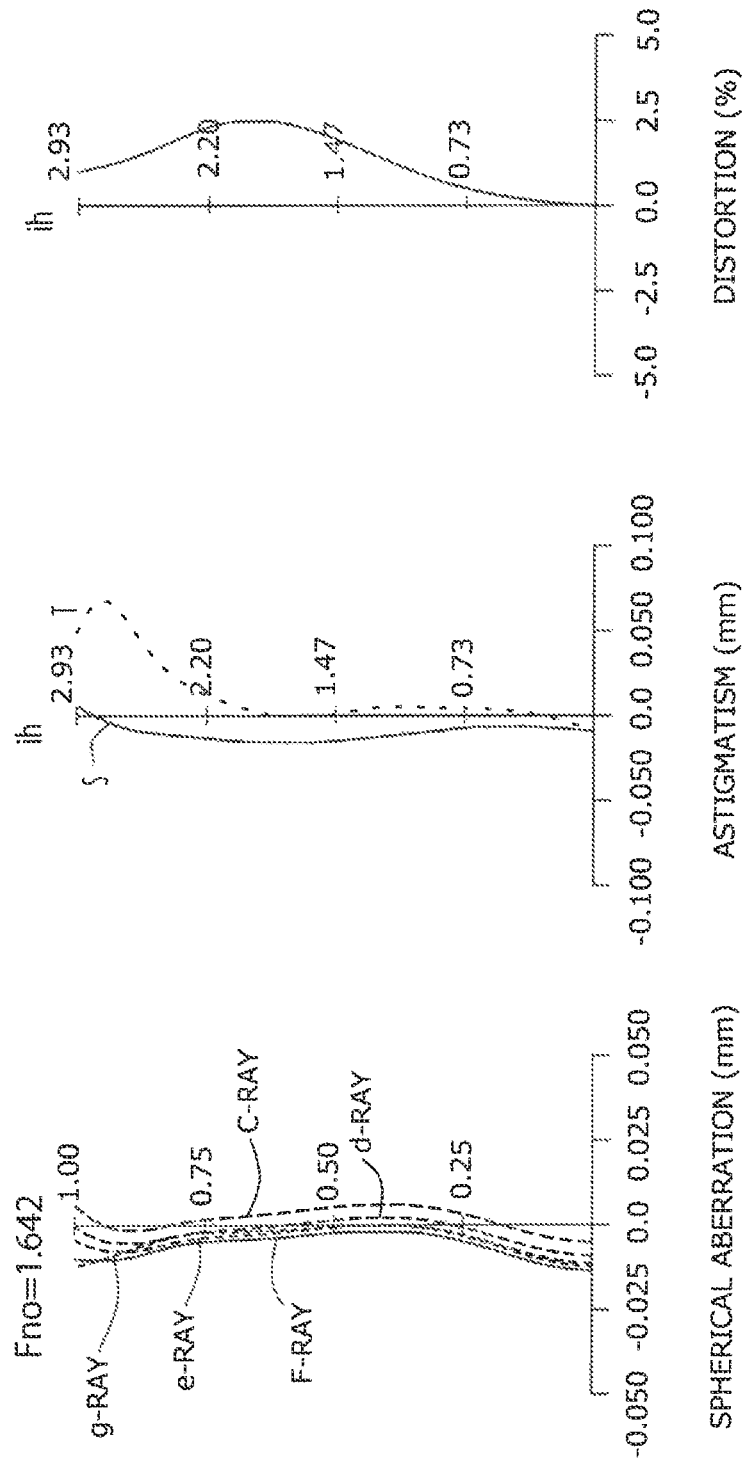
FIG. 6 shows spherical aberration, astigmatism and distortion of the imaging lens according to Embodiment 3.
Figure 7:
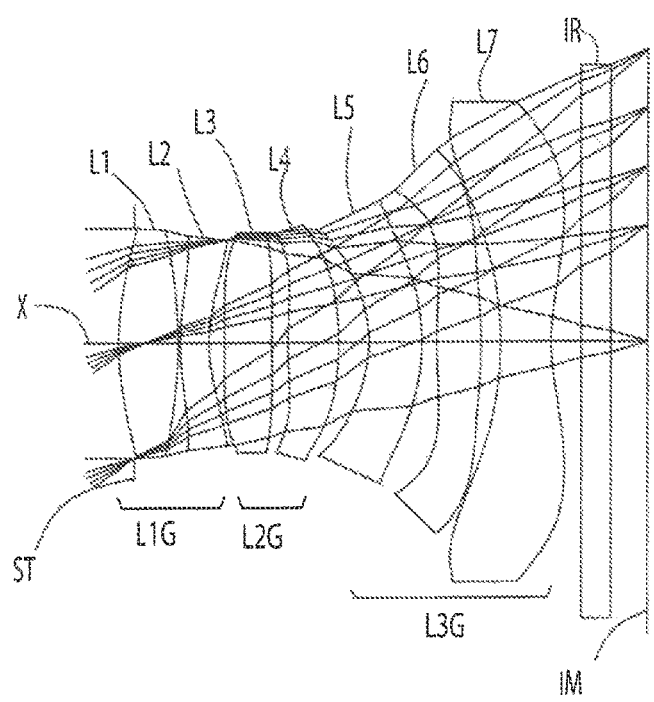
FIG. 7 is a schematic view showing the general configuration of an imaging lens according to Embodiment 4 of the invention.

FIG. 6 shows aberrations of the imaging lens in Embodiment 3. As FIG. 6 indicates, aberrations are properly corrected.

Embodiment 4

The basic lens data of Embodiment 4 is shown below in Table 4.

TABLE 4

Numerical Example 4
in mm f = 4.06
Fno = 1.77
ω (deg) = 35.40
ih = 2.934

Surface Data

| Surface No. 1 | Curvature Radius r | Surface Distance d | Refractive Index Nd | Abbe Number vd |
|---|---|---|---|---|
| (Object Plane) | Infinity | Infinity | | |
| Stop | Infinity | −0.160 | | |
| 1* | 2.935286 | 0.590 | 1.535 | 56.16 |
| 2* | −4.525 | 0.025 | | |
| 3* | 2.796 | 0.280 | 1.635 | 23.91 |
| 4* | 1.789 | 0.147 | | |
| 5* | −158.499 | 0.467 | 1.535 | 56.16 |
| 6* | 19.222 | 0.158 | | |
| 7* | 5.675 | 0.500 | 1.535 | 56.16 |
| 8* | −2.893 | 0.298 | | |
| 9* | −1.252 | 0.523 | 1.635 | 23.91 |
| 10* | −2.094 | 0.148 | | |
| 11* | 5.867 | 0.442 | 1.535 | 56.18 |
| 12* | −3.556 | 0.196 | | |
| 13* | −3.417 | 0.500 | 1.535 | 56.16 |
| 14* | 2.085 | 0.200 | | |
| 15 | Infinity | 0.300 | 1.517 | 64.20 |
| Image Plane | Infinity | 0.456 | | |

Aspheric Surface Data

| | 1st Surface | 2nd Surface | 3rd Surface | 4th Surface | 5th Surface | 6th Surface | 7th Surface |
|---|---|---|---|---|---|---|---|
| k | −1.728E+00 | 0.000E+00 | −1.452E+01 | −4.495E+00 | 0.000E+00 | 0.000E+00 | 0.000E+00 |
| A4 | −8.793E−03 | 1.666E−02 | −2.736E−02 | −2.917E−02 | 8.729E−02 | −7.674E−02 | −1.242E−01 |
| A6 | −8.864E−03 | −2.131E−03 | −2.717E−02 | −4.670E−02 | −1.203E−02 | −1.755E−02 | −3.075E−02 |
| A8 | −3.025E−03 | −7.083E−03 | −9.299E−03 | 2.392E−02 | 3.562E−02 | 6.117E−02 | −7.124E−02 |
| A10 | 8.049E−04 | 4.274E−03 | 1.555E−02 | −1.117E−02 | −3.257E−02 | −1.808E−02 | 8.458E−02 |
| A12 | 2.723E−03 | 1.827E−03 | −3.963E−03 | 8.747E−03 | 2.798E−02 | −7.479E−06 | −1.490E−02 |
| A14 | −1.335E−03 | −1.635E−03 | 4.183E−04 | 3.100E−04 | −1.074E−02 | 1.834E−05 | −1.890E−05 |

TABLE 4-continued

| | | | | | | | |
|---|---|---|---|---|---|---|---|
| A16 | 0.000E+00 | 0.000E+00 | 1.745E−06 | −5.850E−08 | −8.096E−06 | −7.485E−13 | 1.206E−12 |

| | 8th Surface | 9th Surface | 10th Surface | 11th Surface | 12th Surface | 13th Surface | 14th Surface |
|---|---|---|---|---|---|---|---|
| k | 0.000E+00 | 1.032E−01 | −8.453E−01 | 3.207E+00 | −5.977E+01 | −1.034E+00 | −1.715E+01 |
| A4 | 2.627E−02 | 2.287E−01 | −8.115E−03 | −1.104E−01 | 4.714E−02 | −5.604E−03 | −3.508E−02 |
| A6 | −1.158E−01 | −1.590E−01 | 2.289E−02 | 2.421E−02 | −3.006E−02 | 1.367E−03 | 4.955E−03 |
| A8 | 4.283E−03 | 9.158E−02 | −9.014E−03 | −1.343E−02 | 2.261E−03 | 2.472E−04 | −8.523E−04 |
| A10 | 4.754E−02 | −3.735E−03 | −7.443E−05 | 1.447E−04 | 9.250E−04 | 5.213E−05 | 4.546E−06 |
| A12 | −1.93.E−02 | −3.195E−03 | 1.151E−03 | 2.587E−04 | −1.738E−04 | 3.845E−06 | 6.425E−06 |
| A14 | 5.602E−03 | 2.404E−03 | 0.000E+00 | 0.000E+00 | 0.000E+00 | −4.390E−06 | 5.165E−07 |
| A16 | 2.740E−05 | 0.000E+00 | 0.000E+00 | 0.000E+00 | 0.000E+00 | 3.974E−07 | −4.106E−08 |

Consituent Lens Data

| Lens | Start Surface | Focal Length |
|---|---|---|
| 1 | 1 | 3.424 |
| 2 | 3 | −8.761 |
| 3 | 5 | −32.036 |
| 4 | 7 | 3.659 |
| 5 | 9 | −6.457 |
| 6 | 11 | 4.210 |
| 7 | 13 | −2.348 |

Lens Group Data

| | | |
|---|---|---|
| L1G | f12 | 4.891 |
| L2G | f34 | 4.071 |
| L3G | f567 | −2.818 |

As shown in Table 12, the imaging lens in Embodiment 4 satisfies all the conditional expressions (1) to (14).

Figure 8:
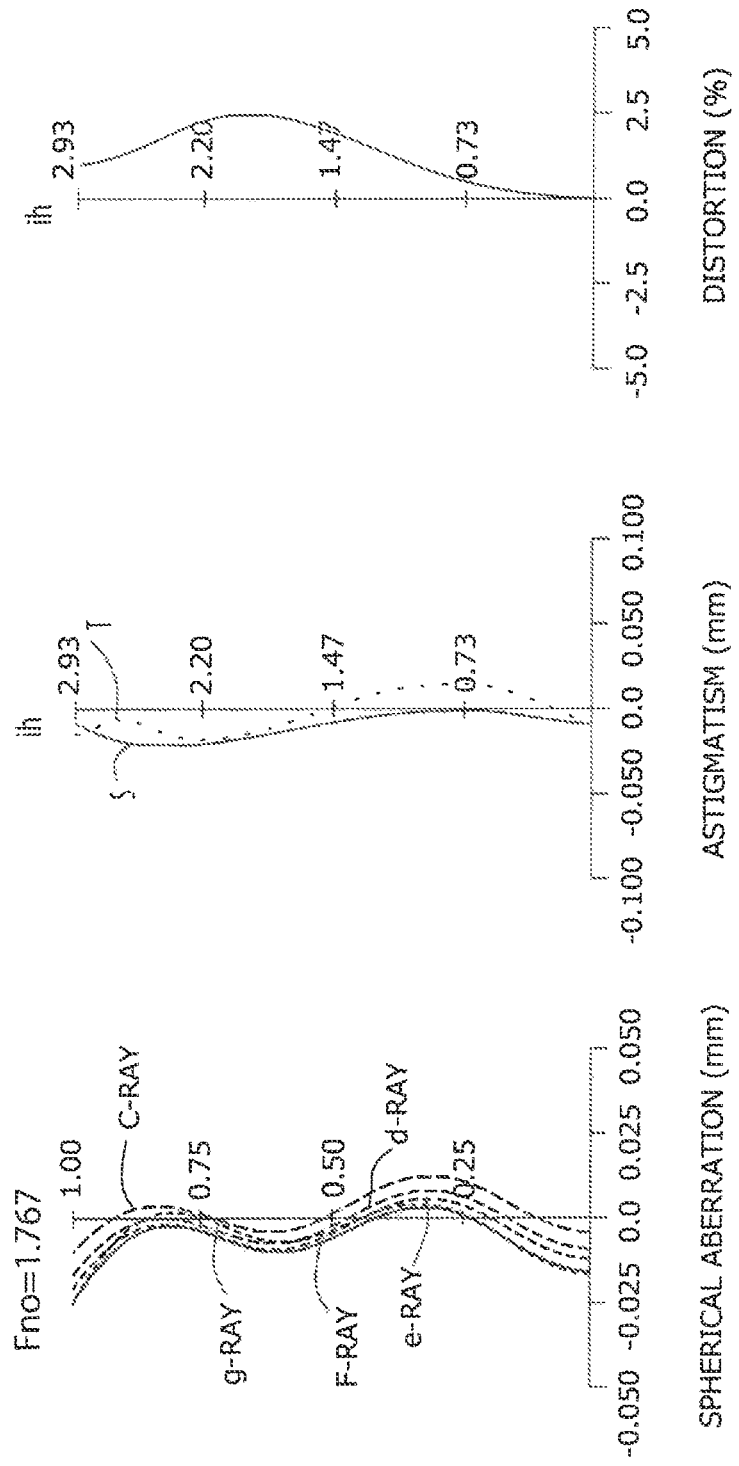
FIG. 8 shows spherical aberration, astigmatism and distortion of the imaging lens according to Embodiment 4.
Figure 9:
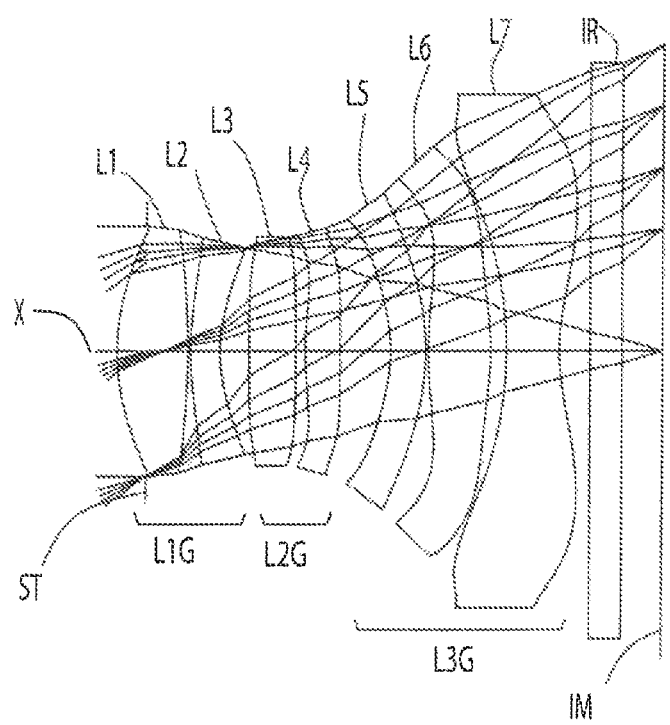
FIG. 9 is a schematic view showing the general configuration of an imaging lens according to Embodiment 5 of the invention.

FIG. 8 shows aberrations of the imaging lens in Embodiment 4. As FIG. 8 indicates, aberrations are properly corrected.

Embodiment 5

The basic lens data of Embodiment 5 is shown below in Table 5.

TABLE 5

Numerical Example 5
in mm f = 4.06
Fno = 1.70
ω (deg) = 35.48
ih = 2.934

Surface Data

| Surface No. 1 | Curvature Radius r | Surface Distance d | Refractive Index Nd | Abbe Number vd |
|---|---|---|---|---|
| (Object Plane) | Infinity | Infinity | | |
| Stop | Infinity | −0.280 | | |
| 1* | 2.199 | 0.673 | 1.535 | 56.16 |
| 2* | −7.201 | 0.025 | | |
| 3* | 2.952 | 0.280 | 1.635 | 23.91 |
| 4* | 1.568 | 0.270 | | |
| 5* | −184.316 | 0.431 | 1.535 | 56.16 |
| 6* | −300.000 | 0.091 | | |
| 7* | 3.444 | 0.321 | 1.535 | 56.16 |
| 8* | 45.345 | 0.470 | | |
| 9* | −1.627 | 0.330 | 1.635 | 23.91 |
| 10* | −2.488 | 0.025 | | |
| 11* | 3.497 | 0.587 | 1.535 | 56.16 |
| 12* | −2.485 | 0.158 | | |
| 13* | −3.670 | 0.600 | 1.535 | 56.16 |
| 14* | 1.802 | 0.200 | | |
| 15 | Infinity | 0.600 | 1.517 | 64.20 |
| Image Plane | Infinity | 0.488 | | |

TABLE 5-continued

Aspheric Surface Data

|    | 1st Surface | 2nd Surface | 3rd Surface | 4th Surface | 5th Surface | 6th Surface | 7th Surface |
|----|---|---|---|---|---|---|---|
| k  | −4.635E−01 | 0.000E+00 | −2.022E+01 | −4.265E+00 | 0.000E+00 | 0.000E+00 | 0.000E+00 |
| A4 | 1.355E−03 | 2.308E−02 | −1.899E−02 | −1.417E−02 | 8.388E−02 | −4.456E−02 | −1.365E−01 |
| A6 | −8.860E−03 | −7.265E−03 | −1.492E−02 | −1.925E−02 | −5.132E−02 | −1.264E−02 | −4.332E−02 |
| A8 | 2.259E−03 | −8.455E−03 | 1.867E−02 | 3.706E−02 | 3.655E−02 | 2.668E−02 | −3.937E−02 |
| A10 | −4.702E−03 | 2.588E−03 | −1.077E−03 | −2.419E−02 | −2.647E−02 | −1.062E−02 | 5.922E−02 |
| A12 | 2.723E−03 | 1.828E−03 | −3.965E−03 | 8.752E−03 | 2.799E−02 | −7.501E−03 | −1.488E−02 |
| A14 | −1.335E−03 | −1.635E−03 | 4.167E−04 | 3.157E−04 | −1.073E−02 | −9.935E−12 | 1.736E−11 |
| A16 | 0.000E+00 | 0.000E+00 | 5.039E−07 | −5.850E−08 | −8.096E−06 | −6.662E−13 | 1.070E−12 |

|    | 8th Surface | 9th Surface | 10th Surface | 11th Surface | 12th Surface | 13th Surface | 14th Surface |
|----|---|---|---|---|---|---|---|
| k  | 0.000E+00 | 5.475E−01 | −1.575E+00 | −1.255E+01 | −2.975E+01 | −7.984E−01 | −1.433E+01 |
| A4 | −2.061E−02 | 2.406E−01 | −4.202E−03 | −8.955E−02 | 6.374E−02 | −6.524E−03 | −3.372E−02 |
| A6 | −9.788E−02 | −1.629E−01 | 1.877E−02 | 3.517E−02 | −3.547E−02 | 1.339E−03 | 5.072E−03 |
| A8 | −1.090E−02 | 8.033E−02 | −7.277E−03 | −1.792E−02 | 2.462E−03 | 2.100E−04 | −7.995E−04 |
| A10 | 5.618E−02 | −1.141E−02 | −2.522E−04 | 4.603E−04 | 1.071E−03 | 5.745E−05 | −2.421E−06 |
| A12 | −1.933E−02 | −3.120E−03 | 3.664E−04 | 7.653E−04 | −1.950E−04 | 8.438E−07 | 5.477E−06 |
| A14 | 5.573E−03 | 2.388E−03 | 0.000E+00 | 0.000E+00 | 0.000E+00 | −1.789E−06 | 6.492E−07 |
| A16 | 2.179E−06 | 0.000E+00 | 0.000E+00 | 0.000E+00 | 0.000E+00 | 4.723E−08 | −2.806E−08 |

Consituent Lens Data

| Lens | Start Surface | Focal Length |
|---|---|---|
| 1 | 1 | 3.232 |
| 2 | 3 | −5.714 |
| 3 | 5 | −895.215 |
| 4 | 7 | 6.953 |
| 5 | 9 | −8.694 |
| 6 | 11 | 2.814 |
| 7 | 13 | −2.191 |

Lens Group Data

| | | |
|---|---|---|
| L1G | f12 | 5.686 |
| L2G | f34 | 7.001 |
| L3G | f567 | −6.290 |

As shown in Table 12, the imaging lens in Embodiment 5 satisfies all the conditional expressions (1) to (14).

Figure 10:
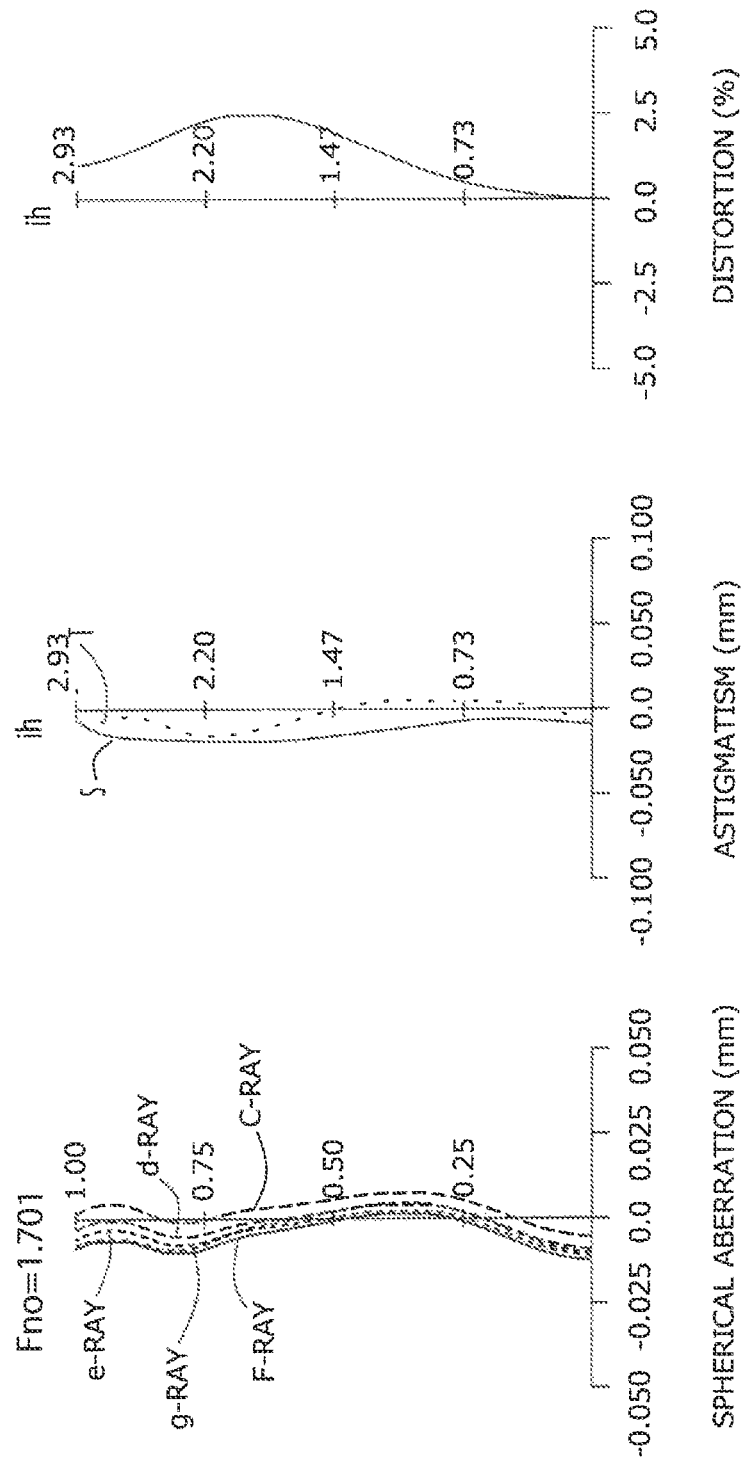
FIG. 10 shows spherical aberration, astigmatism and distortion of the imaging lens according to Embodiment 5.
Figure 11:
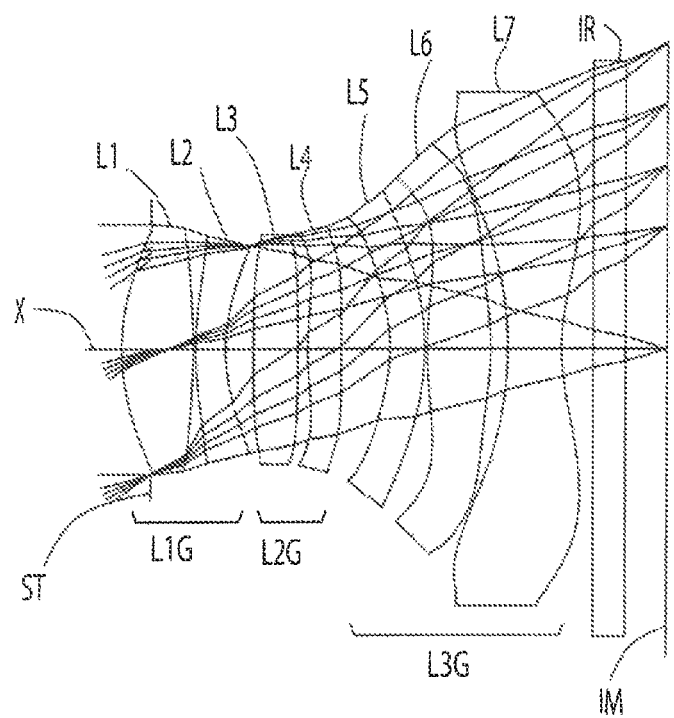
FIG. 11 is a schematic view showing the general configuration of an imaging lens according to Embodiment 6 of the invention.

FIG. 10 shows aberrations of the imaging lens in Embodiment 5. As FIG. 10 indicates, aberrations are properly corrected.

Embodiment 6

The basic lens data of Embodiment 6 is shown below in Table 6.

TABLE 6

Numerical Example 6
in mm f = 4.06
Fno = 1.70
ω (deg) = 35.43
ih = 2.934

Surface Data

| Surface No. | Curvature Radius r | Surface Distance d | Refractive Index Nd | Abbe Number vd |
|---|---|---|---|---|
| (Object Plane) | Infinity | Infinity | | |
| Stop | Infinity | −0.280 | | |
| 1* | 2.205 | 0.673 | 1.535 | 56.16 |
| 2* | −7.131 | 0.025 | | |
| 3* | 2.963 | 0.280 | 1.635 | 23.91 |
| 4* | 1.572 | 0.268 | | |
| 5* | −200.000 | 0.431 | 1.535 | 56.16 |
| 6* | −164.292 | 0.093 | | |
| 7* | 3.501 | 0.320 | 1.535 | 56.16 |
| 8* | 48.834 | 0.472 | | |
| 9* | −1.627 | 0.329 | 1.635 | 23.91 |
| 10* | 2.492 | 0.025 | | |

TABLE 6-continued

| | | | | |
|---|---|---|---|---|
| 11* | 3.480 | 0.588 | 1.535 | 56.16 |
| 12* | -2.484 | 0.157 | | |
| 13* | -3.645 | 0.500 | 1.535 | 56.16 |
| 14* | 1.806 | 0.200 | | |
| 15 | Infinity | 0.300 | 1.517 | 64.20 |
| Image Plane | Infinity | 0.488 | | |

Aspheric Surface Data

| | 1st Surface | 2nd Surface | 3rd Surface | 4th Surface | 5th Surface | 6th Surface | 7th Surface |
|---|---|---|---|---|---|---|---|
| k | -4.675E-01 | 0.000E+00 | -2.034E+01 | -4.261E+00 | 0.000E+00 | 0.000E+00 | 0.000E+00 |
| A4 | 1.192E-03 | 2.321E-02 | -1.884E-02 | -1.443E-02 | 8.378E-02 | -4.398E-02 | -1.363E-01 |
| A6 | -9.122E-03 | -7.462E-03 | -1.513E-02 | -1.905E-02 | -5.046E-02 | -1.311E-02 | -4.411E-02 |
| A8 | 2.504E-03 | -7.946E-03 | 1.891E-02 | 3.613E-02 | 3.545E-02 | 2.577E-02 | -3.942E-02 |
| A10 | -4.729E-03 | 2.339E-03 | -1.513E-03 | -2.437E-02 | -2.629E-02 | -1.024E-02 | 5.899E-02 |
| A12 | 2.723E-03 | 1.828E-03 | -3.965E-03 | 8.752E-03 | 2.799E-02 | -7.501E-03 | -1.488E-02 |
| A14 | -1.335E-03 | -1635E-03 | 4.167E-04 | 3.157E-04 | -1.073E-02 | -9.901E-12 | 1.730E-11 |
| A16 | 0.000E+00 | 0.000E+00 | 5.039E-07 | -5.850E-08 | -8.096E-06 | -6.649E-13 | 1.066E-12 |

| | 8th Surface | 9th Surface | 10th Surface | 11th Surface | 12th Surface | 13th Surface | 14th Surface |
|---|---|---|---|---|---|---|---|
| k | 0.000E+00 | 5.498E-01 | -1.568E+00 | -1.282E+01 | -2.938E+01 | -8.484E-01 | -1.428E+01 |
| A4 | -2.172E-02 | 2.400E-01 | -4.363E-03 | -8.905E-02 | 8.399E-02 | -6.387E-03 | -3.380E-02 |
| A6 | -9.730E-02 | -1.628E-01 | 1.859E-02 | 3.502E-02 | -3.560E-02 | 1.352E-03 | 5.113E-03 |
| A8 | -1.055E-02 | 8.035E-02 | -7.275E-03 | -1.798E-02 | 2.451E-03 | 2.099E-04 | -7.957E-04 |
| A10 | 5.592E-02 | -1.149E-02 | -2.444E-04 | 4.962E-03 | 1.074E-03 | 5.696E-05 | 2.630E-06 |
| A12 | -1.933E-02 | -3.120E-03 | 3.683E-04 | 7.618E-04 | -1.944E-04 | 6.394E-07 | 5.422E-06 |
| A14 | 5.573E-03 | 2.388E-03 | 0.000E+00 | 0.000E+00 | 0.000E+00 | -1.767E-06 | 6.443E-07 |
| A16 | 2.179E-06 | 0.000E+00 | 0.000E+00 | 0.000E+00 | 0.000E+00 | 4.729E-08 | -2.866E-08 |

Consituent Lens Data

| Lens | Start Surface | Focal Length |
|---|---|---|
| 1 | 1 | 3.231 |
| 2 | 3 | -5.716 |
| 3 | 5 | 1713.993 |
| 4 | 7 | 7.038 |
| 5 | 9 | -8.651 |
| 6 | 11 | 2.808 |
| 7 | 13 | -2.189 |

Lens Group Data

| | | |
|---|---|---|
| L1G | f12 | 5.685 |
| L2G | f34 | 7.004 |
| L3G | f567 | -6.283 |

As shown in Table 12, the imaging lens in Embodiment 6 satisfies all the conditional expressions (1) to (14).

Figure 12:
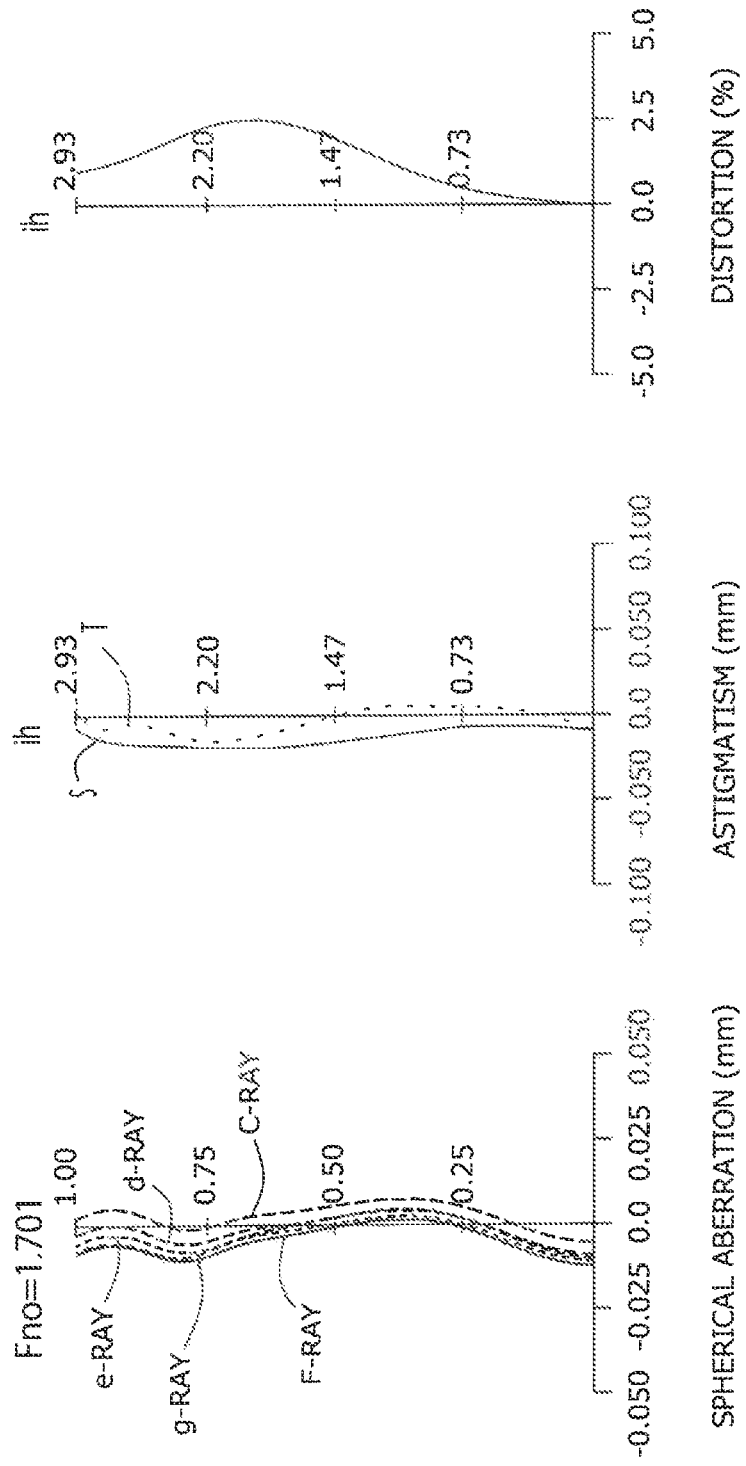
FIG. 12 shows spherical aberration, astigmatism and distortion of the imaging lens according to Embodiment 6.
Figure 13:
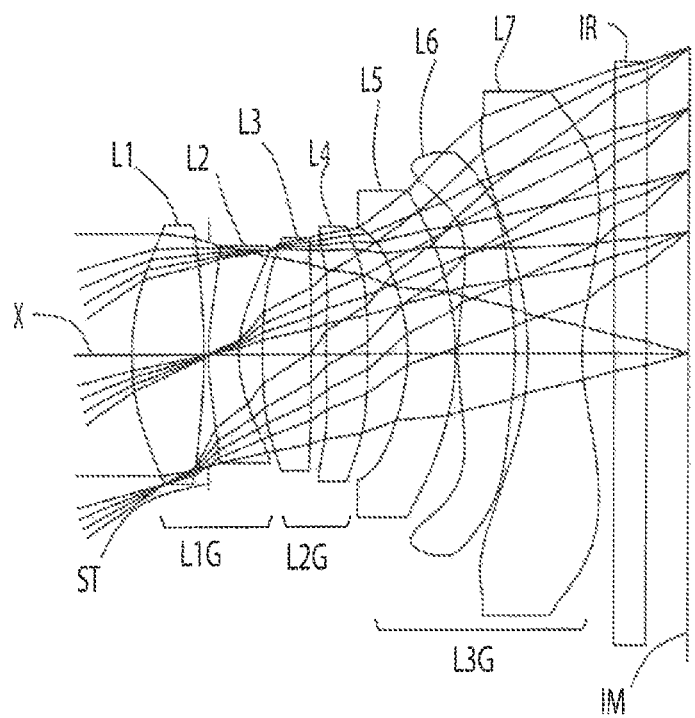
FIG. 13 is a schematic view showing the general configuration of an imaging lens according to Embodiment 7 of the invention.

FIG. 12 shows aberrations of the imaging lens in Embodiment 6. As FIG. 12 indicates, aberrations are properly corrected.

Embodiment 7

The basic lens data of Embodiment 7 is shown below in Table 7.

TABLE 7

Numerical Example 7
in mm f = 4.05
Fno = 1.75
ω (deg) = 35.61
ih = 2.934

Surface Data

| Surface No. 1 | Curvature Radius r | Surface Distance d | Refractive Index Nd | Abbe Number vd |
|---|---|---|---|---|
| (Object Plane) | Infinity | Infinity | | |
| 1* | 2.404 | 0.672 | 1.544 | 55.57 |
| 2* | -5.382 | 0.045 | | |

TABLE 7-continued

| | | | | |
|---|---|---|---|---|
| Stop | Infinity | 0.000 | | |
| 3* | 2.450 | 0.284 | 1.584 | 30.13 |
| 4* | 1.200 | 0.222 | | |
| 5* | 7.093 | 0.470 | 1.535 | 56.16 |
| 6* | −31.373 | 0.140 | | |
| 7* | 8.345 | 0.403 | 1.535 | 56.16 |
| 8* | −10.762 | 0.384 | | |
| 9* | −1.624 | 0.454 | 1.635 | 23.91 |
| 10* | −2.558 | 0.025 | | |
| 11* | 3.020 | 0.540 | 1.535 | 56.16 |
| 12* | −2.637 | 0.119 | | |
| 13* | −3.083 | 0.500 | 1.535 | 56.16 |
| 14* | 1.881 | 0.150 | | |
| 15 | Infinity | 0.300 | 1.517 | 64.20 |
| Image Plane | Infinity | 0.534 | | |

Aspheric Surface Data

| | 1st Surface | 2nd Surface | 3rd Surface | 4th Surface | 5th Surface | 6th Surface | 7th Surface |
|---|---|---|---|---|---|---|---|
| k | −3.943E−01 | 0.000E+00 | −1.683E+01 | −3.972E+00 | 3.597E+01 | 0.000E+00 | 0.000E+00 |
| A4 | 1.631E−03 | 5.694E−02 | −3.154E−02 | 5.397E−03 | 8.776E−02 | −2.498E−03 | −1.017E−01 |
| A6 | −5.169E−03 | −3.331E−02 | −2.365E−02 | −4.285E−03 | −2.171E−02 | −1.268E−02 | −2.511E−02 |
| A8 | 9.491E−05 | 2.332E−03 | 3.170E−02 | 9.553E−04 | 1.710E−02 | 2.576E−02 | −1.011E−02 |
| A10 | −2.739E−03 | 1.010E−02 | −1.689E−02 | −2.118E−02 | −4.550E−02 | −2.670E−03 | 4.737E−02 |
| A12 | 3.000E−03 | −8.257E−03 | 2.964E−03 | 8.910E−03 | 2.772E−02 | −7.013E−03 | −1.260E−02 |
| A14 | −1.537E−03 | 1.528E−03 | 3.342E−04 | 3.157E−04 | −1.073E−02 | −5.714E−04 | −3.013E−04 |
| A16 | 0.000E+00 | 0.000E+00 | 5.039E−07 | −5.851E−08 | −8.098E−06 | −1.278E−11 | 1.409E−11 |

| | 8th Surface | 9th Surface | 10th Surface | 11th Surface | 12th Surface | 13th Surface | 14th Surface |
|---|---|---|---|---|---|---|---|
| k | 0.000E+00 | 7.301E−01 | −1.766E+00 | −1.113E+00 | −3.365E+01 | −3.366E+00 | −1.524E+01 |
| A4 | −3.701E−02 | 2.275E−01 | −7.766E−03 | −1.179E−01 | 5.766E−02 | −2.775E−03 | −3.197E−02 |
| A6 | −6.692E−02 | −1.632E−01 | 1.693E−02 | 2.820E−02 | −4.280E−02 | 1.567E−03 | 4.905E−03 |
| A8 | 8.470E−03 | 8.434E−02 | −9.276E−03 | −1.651E−02 | 4.030E−03 | 1.340E−04 | −8.011E−04 |
| A10 | 3.976E−02 | −1.428E−02 | −5.192E−04 | 4.376E−04 | 1.448E−03 | 3.784E−05 | −7.948E−05 |
| A12 | −2.226E−02 | −3.256E−03 | 8.022E−04 | 8.409E−04 | −2.718E−04 | −2.875E−06 | 5.054E−06 |
| A14 | 5.439E−03 | 2.575E−03 | 0.000E+00 | 0.000E+00 | 0.000E+00 | −1.884E−06 | 6.557E−07 |
| A16 | 2.179E−06 | 0.000E+00 | 0.000E+00 | 0.000E+00 | 0.000E+00 | 2.029E−07 | −1.084E−08 |

Consituent Lens Data

| Lens | Start Surface | Focal Length |
|---|---|---|
| 1 | 1 | 3.152 |
| 2 | 3 | −4.398 |
| 3 | 5 | 10.867 |
| 4 | 7 | 8.857 |
| 5 | 9 | −8.630 |
| 6 | 11 | 2.724 |
| 7 | 13 | −2.111 |

Lens Group Data

| | | |
|---|---|---|
| L1G | f12 | 6.984 |
| L2G | f34 | 5.008 |
| L3G | f567 | −5.961 |

As shown in Table 12, the imaging lens in Embodiment 7 satisfies all the conditional expressions (1) to (14).

Figure 14:
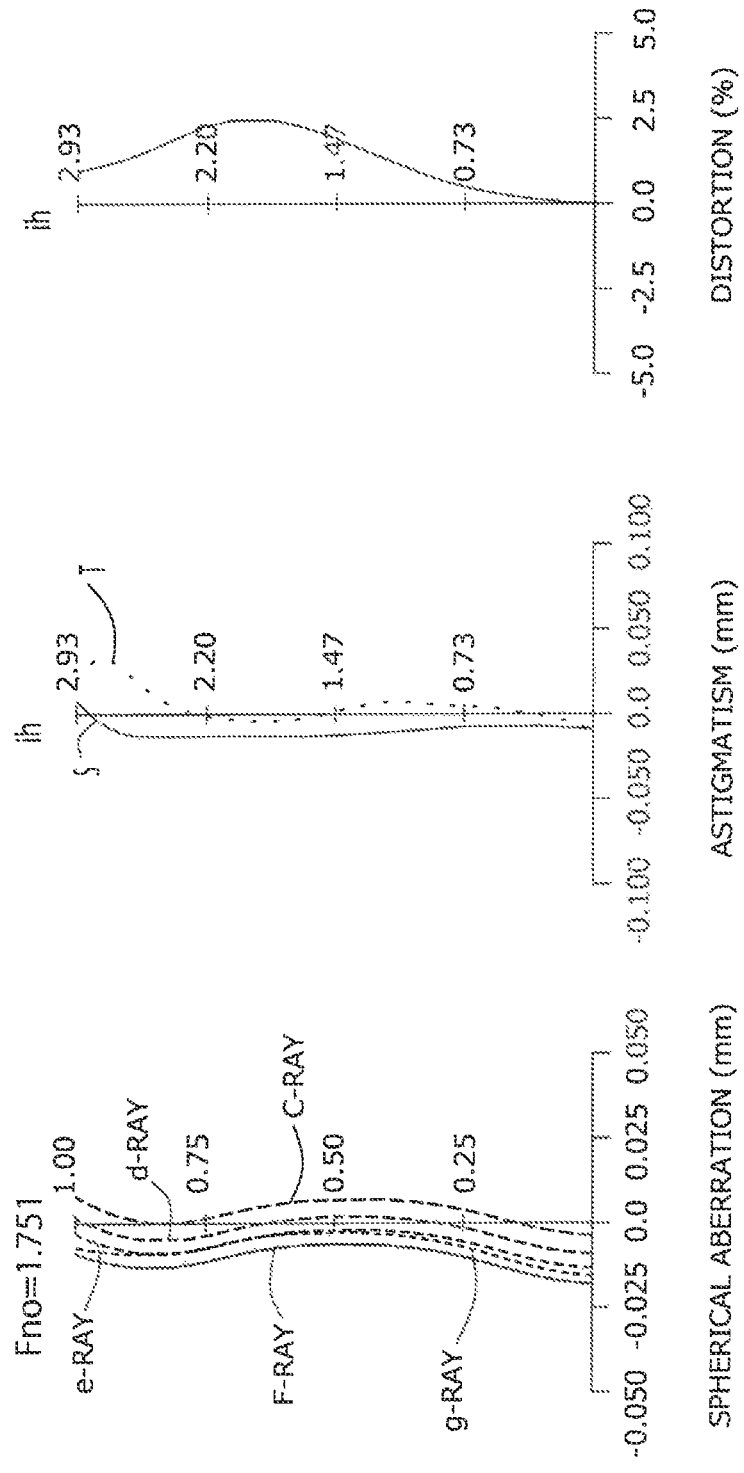
FIG. 14 shows spherical aberration, astigmatism and distortion of the imaging lens according to Embodiment 7.
Figure 15:
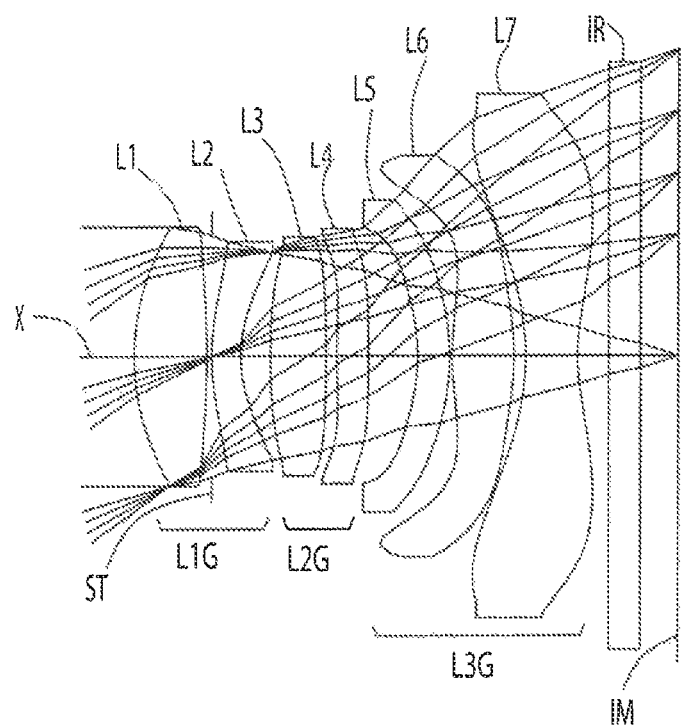
FIG. 15 is a schematic view showing the general configuration of an imaging lens according to Embodiment 8 of the invention.

FIG. 14 shows aberrations of the imaging lens in Embodiment 7. As FIG. 14 indicates, aberrations are properly corrected.

Embodiment 8

The basic lens data of Embodiment 8 is shown below in Table 8.

TABLE 8

Numerical Example 8
in mm f = 4.06
Fno = 1.64
ω (deg) = 35.49
ih = 2.934

Surface Data

| Surface No. 1 | Curvature Radius r | Surface Distance d | Refractive Index Nd | Abbe Number vd |
|---|---|---|---|---|
| (Object Plane) | Infinity | Infinity | | |
| 1* | 2.253 | 0.693 | 1.525 | 56.27 |
| 2* | −8.895 | 0.045 | | |
| Stop | Infinity | 0.000 | | |
| 3* | 2.164 | 0.280 | 1.638 | 23.25 |
| 4* | 1.232 | 0.275 | | |
| 5* | 8.330 | 0.520 | 1.535 | 56.16 |
| 6* | −21.192 | 0.100 | | |
| 7* | 7.846 | 0.300 | 1.535 | 56.16 |
| 8* | −269.017 | 0.459 | | |
| 9* | −1.710 | 0.301 | 1.635 | 23.91 |
| 10* | −2.398 | 0.025 | | |
| 11* | 3.168 | 0.579 | 1.535 | 56.16 |
| 12* | −2.235 | 0.110 | | |
| 13* | −2.438 | 0.500 | 1.535 | 56.16 |
| 14* | 1.975 | 0.150 | | |
| 15 | Infinity | 0.300 | 1.517 | 64.20 |
| Image Plane | Infinity | 0.513 | | |

Aspheric Surface Data

| | 1st Surface | 2nd Surface | 3rd Surface | 4th Surface | 5th Surface | 6th Surface | 7th Surface |
|---|---|---|---|---|---|---|---|
| k | −2.888E−01 | 0.000E+00 | −1.061E+01 | −3.696E+00 | 3.046E+01 | 0.000E+00 | 0.000E+00 |
| A4 | 1.715E−03 | 4.801E−02 | −1.886E−02 | −9.807E−04 | 6.193E−02 | −2.422E−02 | −1.189E−01 |
| A6 | 1.224E−03 | −2.585E−02 | −2.321E−02 | −5.364E−03 | −2.127E−02 | −1.413E−02 | −4.610E−02 |
| A8 | −8.208E−03 | 1.335E−04 | 2.613E−02 | 8.317E−03 | 2.763E−02 | 1.309E−02 | −8.883E−03 |
| A10 | 2.955E−04 | 1.138E−02 | −1.487E−02 | −2.168E−02 | −4.671E−02 | −4.370E−03 | 4.991E−02 |
| A12 | 3.009E−03 | −8.273E−03 | 2.940E−03 | 8.910E−03 | 2.772E−02 | −7.013E−03 | −1.260E−02 |
| A14 | −1.531E−03 | 1.516E−03 | 3.342E−04 | 3.157E−04 | −1.073E−02 | −5.714E−04 | −3.013E−04 |
| A16 | 0.000E+00 | 0.000E+00 | 5.039E−07 | −5.851E−06 | 8.096E−06 | −1.278E−11 | 1.412E−11 |

| | 8th Surface | 9th Surface | 10th Surface | 11th Surface | 12th Surface | 13th Surface | 14th Surface |
|---|---|---|---|---|---|---|---|
| k | 0.000E+00 | 9.183E−01 | −2.247E+00 | −5.619E+00 | −2.489E+01 | −3.907E+00 | −1.858E+01 |
| A4 | −4.675E−02 | 2.500E−01 | −6.726E−03 | −1.259E−01 | 5.112E−02 | −2.344E−03 | −3.200E−02 |
| A6 | −7.491E−02 | −1.739E−01 | 1.220E−02 | 3.058E−02 | −4.453E−02 | 1.555E−03 | 4.923E−03 |
| A8 | 2.545E−03 | 7.428E−02 | −1.265E−02 | −1.777E−02 | 4.813E−03 | 1.297E−04 | −8.109E−04 |
| A10 | 4.829E−02 | −1.224E−02 | −7.321E−04 | −2.495E−04 | 1.537E−03 | 3.729E−05 | −9.330E−06 |
| A12 | −2.269E−02 | −3.256E−03 | 1.164E−03 | 1.078E−03 | −3.376E−04 | −2.411E−06 | 4.774E−06 |
| A14 | 5.439E−03 | 2.575E−03 | 0.000E+00 | 0.000E+00 | 0.000E+00 | −1.838E−06 | 6.553E−07 |
| A16 | 2.179E−06 | 0.000E+00 | 0.000E+00 | 0.000E+00 | 0.000E+00 | 1.873E−07 | 1.178E−10 |

Consituent Lens Data

| Lens | Start Surface | Focal Length |
|---|---|---|
| 1 | 1 | 3.320 |
| 2 | 3 | −5.081 |
| 3 | 5 | 11.254 |
| 4 | 7 | 14.266 |
| 5 | 9 | −11.306 |
| 6 | 11 | 2.546 |
| 7 | 13 | −1.963 |

Lens Group Data

| | | |
|---|---|---|
| L1G | f12 | 6.469 |
| L2G | f34 | 6.379 |
| L3G | f567 | −7.219 |

As shown in Table 12, the imaging lens in Embodiment 8 satisfies all the conditional expressions (1) to (14).

Figure 16:
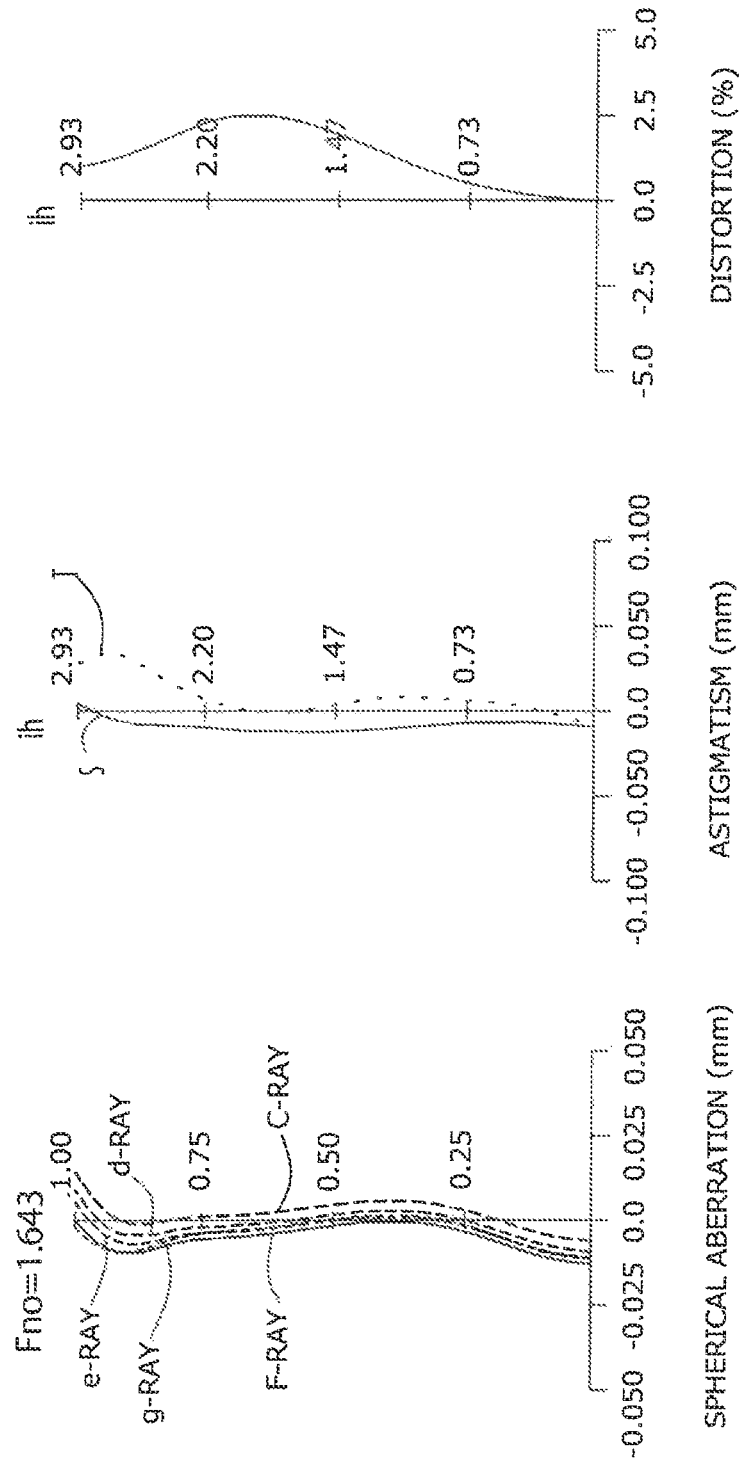
FIG. 16 shows spherical aberration, astigmatism and distortion of the imaging lens according to Embodiment 8.
Figure 17:
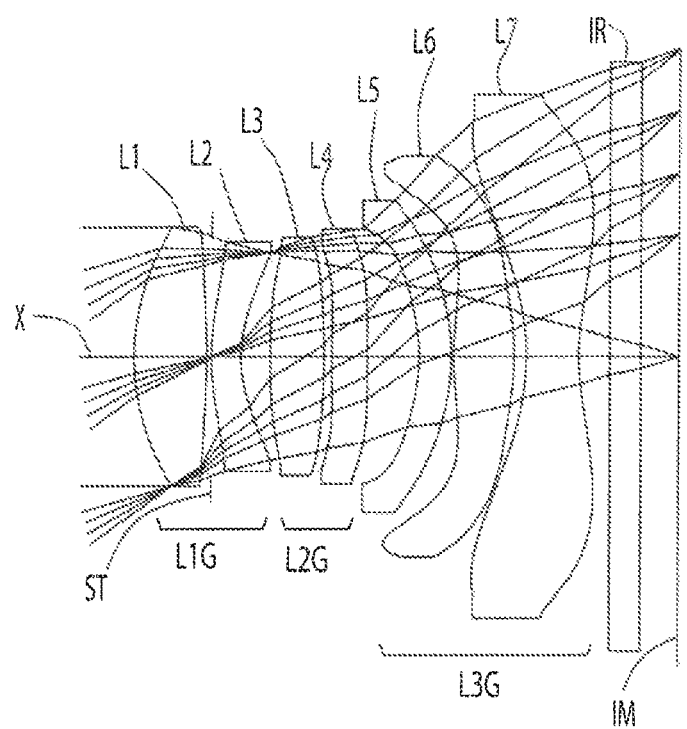
FIG. 17 is a schematic view showing the general configuration of an imaging lens according to Embodiment 9 of the invention.

FIG. 16 shows aberrations of the imaging lens in Embodiment 8. As FIG. 16 indicates, aberrations are properly corrected.

Embodiment 9

The basic lens data of Embodiment 9 is shown below in Table 9.

TABLE 9

Numerical Example 9
in mm f = 4.07
Fno = 1.64
ω (deg) = 35.49
ih = 2.934

Surface Data

| Surface No. 1 | Curvature Radius r | Surface Distance d | Refractive Index Nd | Abbe Number vd |
|---|---|---|---|---|
| (Object Plane) | Infinity | Infinity | | |
| 1* | 2.219 | 0.701 | 1.5346 | 56.16 |
| 2* | −7.060 | 0.045 | | |
| Stop | Infinity | 0.000 | | |
| 3* | 2.297 | 0.280 | 1.6355 | 23.91 |
| 4* | 1.249 | 0.278 | | |
| 5* | 11.178 | 0.500 | 1.5346 | 56.16 |
| 6* | −8.152 | 0.070 | | |
| 7* | 12.115 | 0.328 | 1.5346 | 56.16 |
| 8* | −200.000 | 0.480 | | |
| 9* | −1.691 | 0.300 | 1.5837 | 30.13 |
| 10* | −2.311 | 0.025 | | |
| 11* | 3.479 | 0.569 | 1.5438 | 55.57 |
| 12* | −2.236 | 0.113 | | |
| 13* | −2.374 | 0.500 | 1.5346 | 56.16 |
| 14* | 2.007 | 0.150 | | |
| 15 | Infinity | 0.300 | 1.5168 | 64.20 |
| Image Plane | Infinity | 0.510 | | |

Aspheric Surface Data

| | 1st Surface | 2nd Surface | 3rd Surface | 4th Surface | 5th Surface | 6th Surface | 7th Surface |
|---|---|---|---|---|---|---|---|
| k | −2.306E−01 | 0.000E+00 | −1.277E−01 | −3.911E+00 | 6.879E+01 | 0.000E+00 | 0.000E+00 |
| A4 | 3.417E−03 | 5.124E−02 | −2.163E−02 | 1.289E−03 | 7.098E−02 | −7.027E−03 | −1.065E−01 |
| A6 | −8.869E−05 | −2.576E−02 | −2.561E−02 | −6.662E−03 | −2.096E−02 | −2.189E−02 | −3.629E−02 |
| A8 | −2.895E−03 | −1.315E−03 | 2.173E−02 | 1.358E−03 | 2.542E−02 | 1.831E−02 | −4.598E−03 |
| A10 | −1.021E−03 | 1.155E−02 | −1.143E−02 | −1.840E−02 | −5.076E−02 | 1.230E−03 | 5.102E−02 |
| A12 | 3.009E−03 | −8.273E−03 | 2.940E−03 | 8.910E−03 | 2.772E−02 | −7.013E−03 | −1.260E−02 |
| A14 | −1.531E−03 | 1.516E−03 | 3.342E−04 | 3.157E−04 | −1.073E−02 | −5.714E−04 | −3.013E−04 |
| A16 | 0.000E+00 | 0.000E+00 | 5.039E−07 | −5.851E−08 | −8.096E−06 | −1.278E−11 | 1.412E−11 |

| | 8th Surface | 9th Surface | 10th Surface | 11th Surface | 12th Surface | 13th Surface | 14th Surface |
|---|---|---|---|---|---|---|---|
| k | 0.000E+00 | 8.994E−01 | −1.556E+00 | −5.329E+00 | −2.359E+01 | −3.976E+00 | −1.868E+01 |
| A4 | −4.849E−02 | 2.427E−01 | −1.397E−02 | −1.276E−01 | 4.748E−02 | −2.325E−03 | −3.234E−02 |
| A6 | −5.662E−02 | −1.714E−01 | 1.298E−02 | 2.891E−02 | −4.152E−02 | 1.579E−03 | 4.880E−03 |
| A8 | 4.467E−03 | 7.792E−02 | −9.685E−03 | −1.658E−02 | 4.458E−03 | 1.285E−04 | −8.080E−04 |
| A10 | 3.979E−02 | −1.340E−02 | −1.206E−04 | 3.254E−04 | 1.421E−03 | 3.727E−05 | −8.919E−06 |
| A12 | −2.269E−02 | −3.256E−03 | 8.105E−04 | 8.954E−04 | −3.154E−04 | −3.178E−06 | 4.968E−06 |
| A14 | 5.439E−03 | 2.575E−03 | 0.000E+00 | 0.000E+00 | 0.000E+00 | −1.918E−06 | 6.810E−07 |
| A16 | 2.179E−06 | 0.000E+00 | 0.000E+00 | 0.000E+00 | 0.000E+00 | 2.153E−07 | −6.987E−09 |

Consituent Lens Data

| Lens | Start Surface | Focal Length |
|---|---|---|
| 1 | 1 | 3.243 |
| 2 | 3 | −4.809 |
| 3 | 5 | 8.898 |
| 4 | 7 | 21.377 |
| 5 | 9 | −13.145 |
| 6 | 11 | 2.594 |
| 7 | 13 | −1.956 |

TABLE 9-continued

| Lens Group Data | | |
|---|---|---|
| L1G | f12 | 6.535 |
| L2G | f34 | 6.329 |
| L3G | f567 | −7.314 |

As shown in Table 12, the imaging lens in Embodiment 9 satisfies all the conditional expressions (1) to (14).

Figure 18:
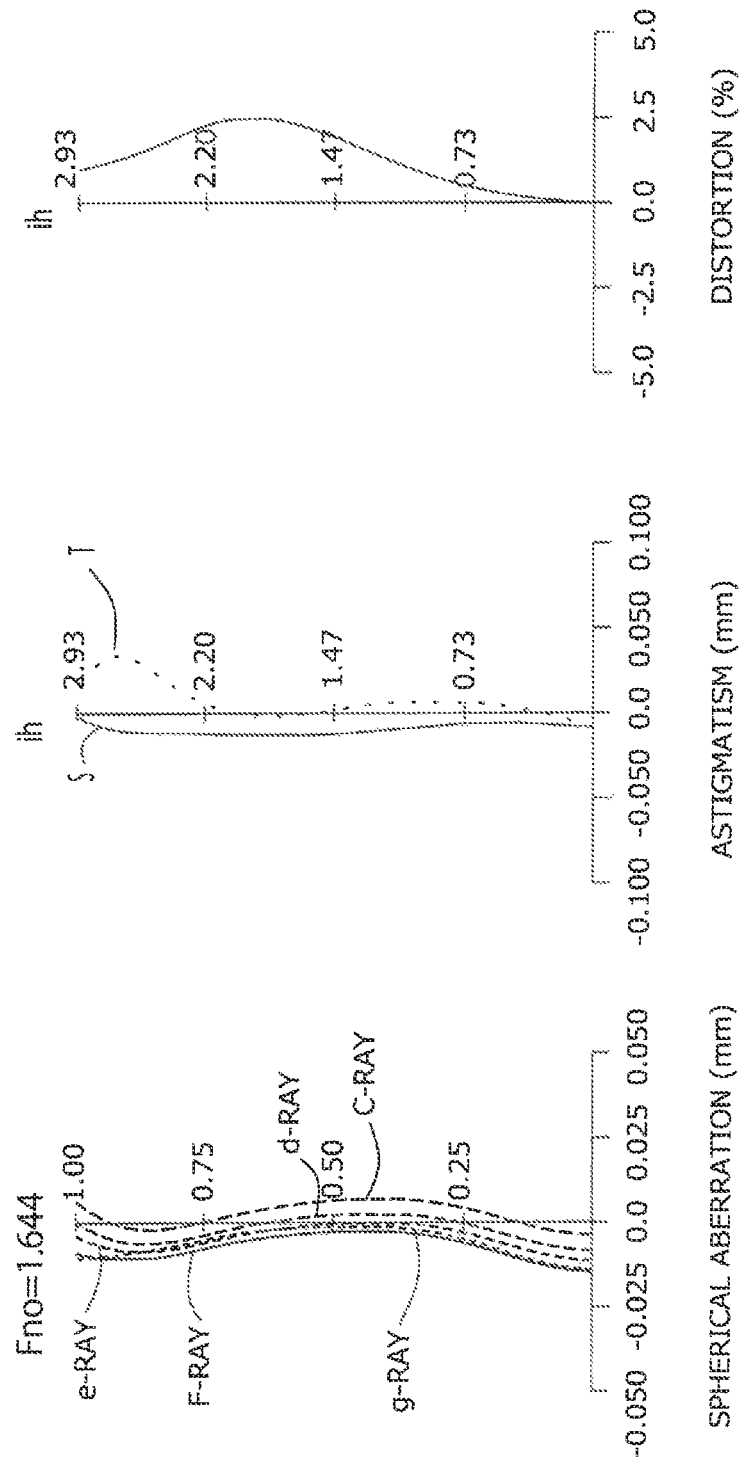
FIG. 18 shows spherical aberration, astigmatism and distortion of the imaging lens according to Embodiment 9.
Figure 19:
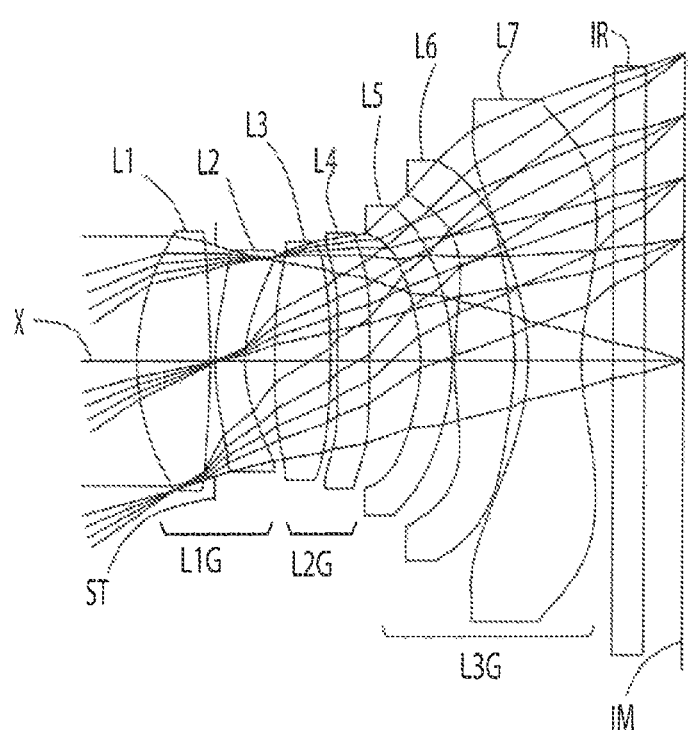
FIG. 19 is a schematic view showing the general configuration of an imaging lens according to Embodiment 10 of the invention.

FIG. 18 shows aberrations of the imaging lens in Embodiment 9. As FIG. 18 indicates, aberrations are properly corrected.

Embodiment 10

The basic lens data of Embodiment 10 is shown below in Table 10.

TABLE 10

Numerical Example 10
in mm f = 4.06
Fno = 1.70
ω (deg) = 35.53
ih = 2.934

Surface Data

| Surface No. | Curvature Radius r | Surface Distance d | Refractive Index Nd | Abbe Number vd |
|---|---|---|---|---|
| (Object Plane) | Infinity | Infinity | | |
| 1* | 2.257 | 0.690 | 1.535 | 56.16 |
| 2* | −6.770 | 0.045 | | |
| Stop | Infinity | 0.000 | | |
| 3* | 2.252 | 0.280 | 1.635 | 23.91 |
| 4* | 1.236 | 0.280 | | |
| 5* | 10.766 | 0.524 | 1.535 | 56.16 |
| 6* | −7.092 | 0.064 | | |
| 7* | 15.875 | 0.312 | 1.535 | 56.16 |
| 8* | −97.403 | 0.487 | | |
| 9* | −1.679 | 0.300 | 1.638 | 23.25 |
| 10* | −2.343 | 0.025 | | |
| 11* | 3.190 | 0.558 | 1.525 | 56.27 |
| 12* | −2.218 | 0.123 | | |
| 13* | −2.470 | 0.500 | 1.535 | 56.16 |
| 14* | 1.990 | 0.150 | | |
| 15 | Infinity | 0.300 | 1.517 | 64.20 |
| Image Plane | Infinity | 0.511 | | |

Aspheric Surface Data

| | 1st Surface | 2nd Surface | 3rd Surface | 4th Surface | 5th Surface | 6th Surface | 7th Surface |
|---|---|---|---|---|---|---|---|
| k | −2.675E−01 | 0.000E+00 | −1.235E+01 | −3.890E+00 | 6.317E+01 | 0.000E+00 | 0.000E+00 |
| A4 | 2.835E−03 | 5.081E−02 | −2.094E−02 | 2.045E−03 | 7.098E−02 | −4.407E−03 | −1.081E−01 |
| A6 | −3.770E−04 | −2.553E−02 | −2.517E−02 | −7.866E−03 | −2.188E−02 | −2.049E−02 | −3.549E−02 |
| A8 | −3.074E−03 | −1.665E−03 | 2.195E−02 | 1.421E−03 | 2.687E−02 | 1.573E−02 | −2.417E−03 |
| A10 | −1.100E−03 | 1.161E−02 | −1.180E−02 | −1.851E−02 | −5.269E−02 | −1.153E−03 | 4.851E−02 |
| A12 | 3.009E−03 | −8.273E−03 | 2.940E−03 | 8.910E−03 | 2.772E−02 | −7.013E−03 | −1.260E−02 |
| A14 | −1.531E−03 | 1.516E−03 | 3.342E−04 | 3.157E−04 | −1.073E−02 | −5.714E−04 | −3.013E−04 |
| A16 | 0.000E+00 | 0.000E+00 | 5.039E−07 | −5.851E−08 | −8.096E−06 | −1.276E−11 | 1.407E−11 |

| | 8th Surface | 9th Surface | 10th Surface | 11th Surface | 12th Surface | 13th Surface | 14th Surface |
|---|---|---|---|---|---|---|---|
| k | 0.000E+00 | 8.737E−01 | −1.988E+00 | −5.827E+00 | −2.402E+01 | −3.572E+00 | −1.847E+01 |
| A4 | −5.418E−02 | 2.372E−01 | −1.233E−02 | −1.219E−01 | 5.305E−02 | −2.695E−03 | −3.226E−02 |
| A6 | −5.584E−02 | −1.670E−01 | 1.072E−02 | 3.061E−02 | −4.250E−02 | 1.565E−03 | 4.844E−03 |
| A8 | 5.910E−03 | 7.501E−02 | −1.023E−02 | −1.693E−02 | 4.137E−03 | 1.312E−04 | −8.119E−04 |
| A10 | 4.054E−02 | −1.329E−02 | −5.739E−04 | 2.135E−04 | 1.419E−03 | 3.660E−05 | −8.884E−06 |
| A12 | −2.269E−02 | −3.256E−03 | 8.171E−04 | 6.919E−04 | −2.989E−04 | −2.900E−06 | 4.995E−06 |
| A14 | 5.439E−03 | 2.575E−03 | 0.000E+00 | 0.000E+00 | 0.000E+00 | −2.031E−06 | 6.532E−07 |
| A16 | 2.179E−06 | 0.000E+00 | 0.000E+00 | 0.000E+00 | 0.000E+00 | 2.280E−07 | −1.226E−08 |

TABLE 10-continued

Consituent Lens Data

| Lens | Start Surface | Focal Length |
|---|---|---|
| 1 | 1 | 3.253 |
| 2 | 3 | −4.829 |
| 3 | 5 | 8.080 |
| 4 | 7 | 25.557 |
| 5 | 9 | −11.268 |
| 6 | 11 | 2.584 |
| 7 | 13 | −1.984 |

Lens Group Data

| L1G | f12 | 6.564 |
|---|---|---|
| L2G | f34 | 6.181 |
| L3G | f567 | −7.127 |

As shown in Table 12, the imaging lens in Embodiment 10 satisfies all the conditional expressions (1) to (14).

Figure 20:
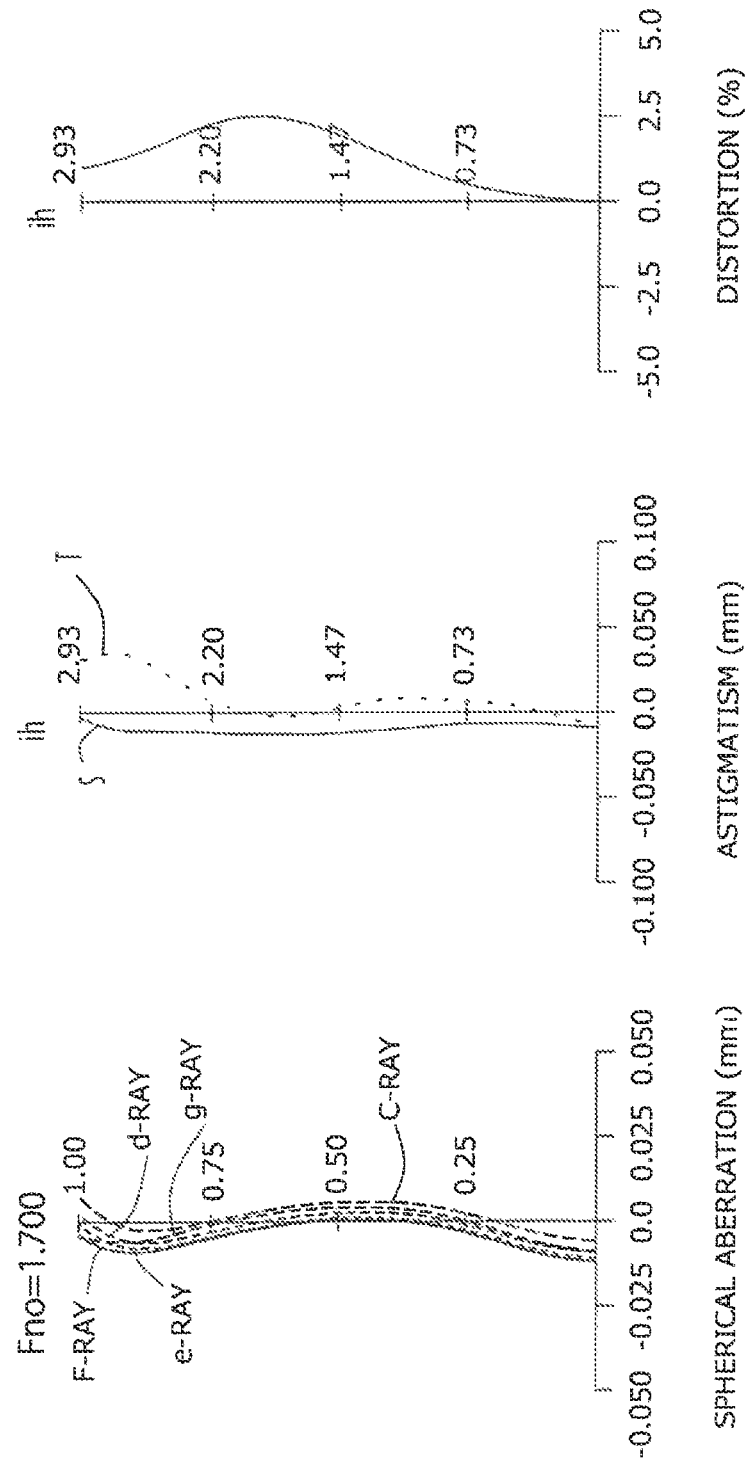
FIG. 20 shows spherical aberration, astigmatism and distortion of the imaging lens according to Embodiment 10.
Figure 21:
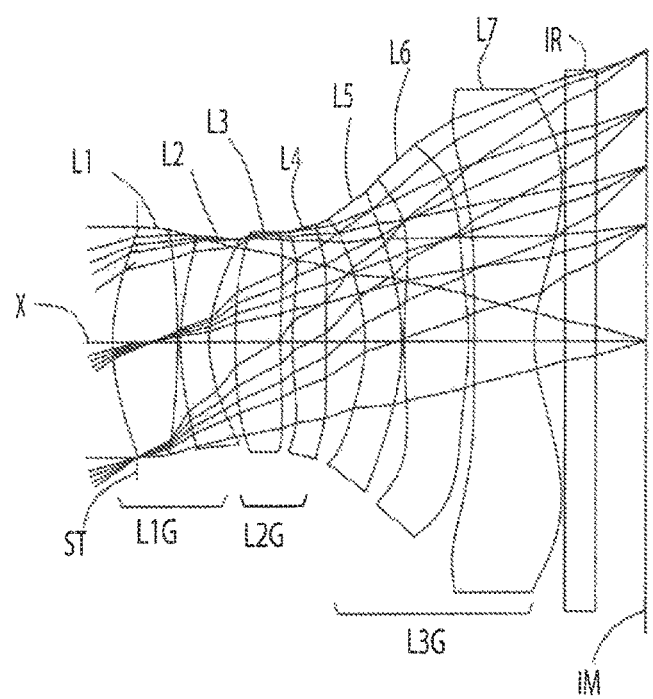
FIG. 21 is a schematic view showing the general configuration of an imaging lens according to Embodiment 11 of the invention.

FIG. 20 shows aberrations of the imaging lens in Embodiment 10. As FIG. 20 indicates, aberrations are properly corrected.

Embodiment 11

The basic lens data of Embodiment 11 is shown below in Table 11.

TABLE 11

Numerical Example 11 in mm f = 4.07
Fno = 1.70
ω (deg) = 35.47
ih = 2.934

Surface Data

| Surface No. | Curvature Radius r | Surface Distance d | Refractive Index Nd | Abbe Number vd |
|---|---|---|---|---|
| (Object Plane) | Infinity | Infinity | | |
| Stop | Infinity | −0.240 | | |
| 1* | 2.364 | 0.629 | 1.5346 | 56.16 |
| 2* | −7.303 | 0.025 | | |
| 3* | 2.330 | 0.280 | 1.6355 | 23.91 |
| 4* | 1.381 | 0.258 | | |
| 5* | 9.014 | 0.440 | 1.5346 | 56.16 |
| 6* | 7.703 | 0.124 | | |
| 7* | 3.159 | 0.333 | 1.5346 | 56.16 |
| 8* | 37.285 | 0.396 | | |
| 9* | −1.602 | 0.366 | 1.6355 | 23.91 |
| 10* | −2.441 | 0.025 | | |
| 11* | 4.919 | 0.669 | 1.5346 | 56.16 |
| 12* | −2.331 | 0.055 | | |
| 13* | 200.000 | 0.591 | 1.5346 | 56.16 |
| 14* | 1.364 | 0.300 | | |
| 15 | Infinity | 0.300 | 1.5168 | 64.20 |
| Image Plane | Infinity | 0.487 | | |

Aspheric Surface Data

| | 1st Surface | 2nd Surface | 3rd Surface | 4th Surface | 5th Surface | 6th Surface | 7th Surface |
|---|---|---|---|---|---|---|---|
| k | −6.277E−01 | 0.000E+00 | −1.072E+01 | −3.602E+00 | 0.000E+00 | 0.000E+00 | 0.000E+00 |
| A4 | −1.162E−03 | 1.307E−02 | −1.946E−02 | 2.841E−03 | 7.088E−02 | −6.124E−02 | −1.258E−01 |
| A6 | −9.783E−03 | 3.583E−03 | 2.596E−03 | −2.403E−02 | −3.019E−02 | 1.385E−02 | −4.787E−02 |
| A8 | 9.449E−05 | −1.872E−02 | 1.065E−03 | 4.151E−02 | 3.806E−02 | 7.662E−03 | −2.045E−02 |
| A10 | −4.001E−03 | 5.843E−03 | 4.905E−03 | −3.297E−02 | −4.648E−02 | −1.205E−02 | 4.427E−02 |
| A12 | 2.723E−03 | 1.827E−03 | −3.963E−03 | 8.746E−03 | 3.390E−02 | −4.133E−03 | −1.275E−02 |
| A14 | −1.335E−03 | −1.635E−03 | 4.185E−04 | 3.094E−04 | −1.074E−02 | 1.862E−05 | −1.889E−05 |
| A16 | 0.000E+00 | 0.000E+00 | 1.919E−06 | −6.113E−07 | −7.977E−06 | 2.356E−07 | 4.033E−10 |

| | 8th Surface | 9th Surface | 10th Surface | 11th Surface | 12th Surface | 13th Surface | 14th Surface |
|---|---|---|---|---|---|---|---|
| k | 0.000E+00 | 5.568E−01 | −4.175E+00 | −3.774E+01 | −2.542E+01 | 0.000E+00 | −8.580E+00 |
| A4 | 1.473E−04 | 2.574E−01 | 8.323E−04 | −6.960E−02 | 7.362E−02 | −2.101E−02 | −3.434E−02 |

TABLE 11-continued

| | | | | | | |
|---|---|---|---|---|---|---|
| A6 | −1.069E−01 | −1.674E−01 | 1.556E−02 | 3.392E−02 | −3.685E−02 | 6.698E−04 | 5.672E−03 |
| A8 | −1.050E−02 | 7.899E−02 | −9.087E−03 | −1.909E−02 | 2.447E−03 | 1.570E−04 | −7.725E−04 |
| A10 | 6.485E−02 | −9.940E−03 | −5.124E−04 | 4.036E−04 | 9.609E−04 | 5.446E−05 | −9.950E−07 |
| A12 | −2.463E−02 | −3.095E−03 | 7.749E−04 | −9.505E−04 | −1.753E−04 | 7.430E−07 | 5.453E−06 |
| A14 | 5.602E−03 | 2.404E−03 | 0.000E+00 | 0.000E+00 | 0.000E+00 | −8.359E−07 | 5.391E−07 |
| A16 | 2.736E−05 | 0.000E+00 | 0.000E+00 | 0.000E+00 | 0.000E+00 | −1.966E−08 | −5.616E−08 |

Constituent Lens Data

| Lens | Start Surface | Focal Length |
|---|---|---|
| 1 | 1 | 3.418 |
| 2 | 3 | −6.029 |
| 3 | 5 | −112.206 |
| 4 | 7 | 6.434 |
| 5 | 9 | −8.836 |
| 6 | 11 | 3.055 |
| 7 | 13 | −2.572 |

Lens Group Data

| | | |
|---|---|---|
| L1G | f12 | 6.011 |
| L2G | f34 | 6.944 |
| L3G | f567 | −8.047 |

As shown in Table 12, the imaging lens in Embodiment 11 satisfies all the conditional expressions (1) to (14).

Figure 22:
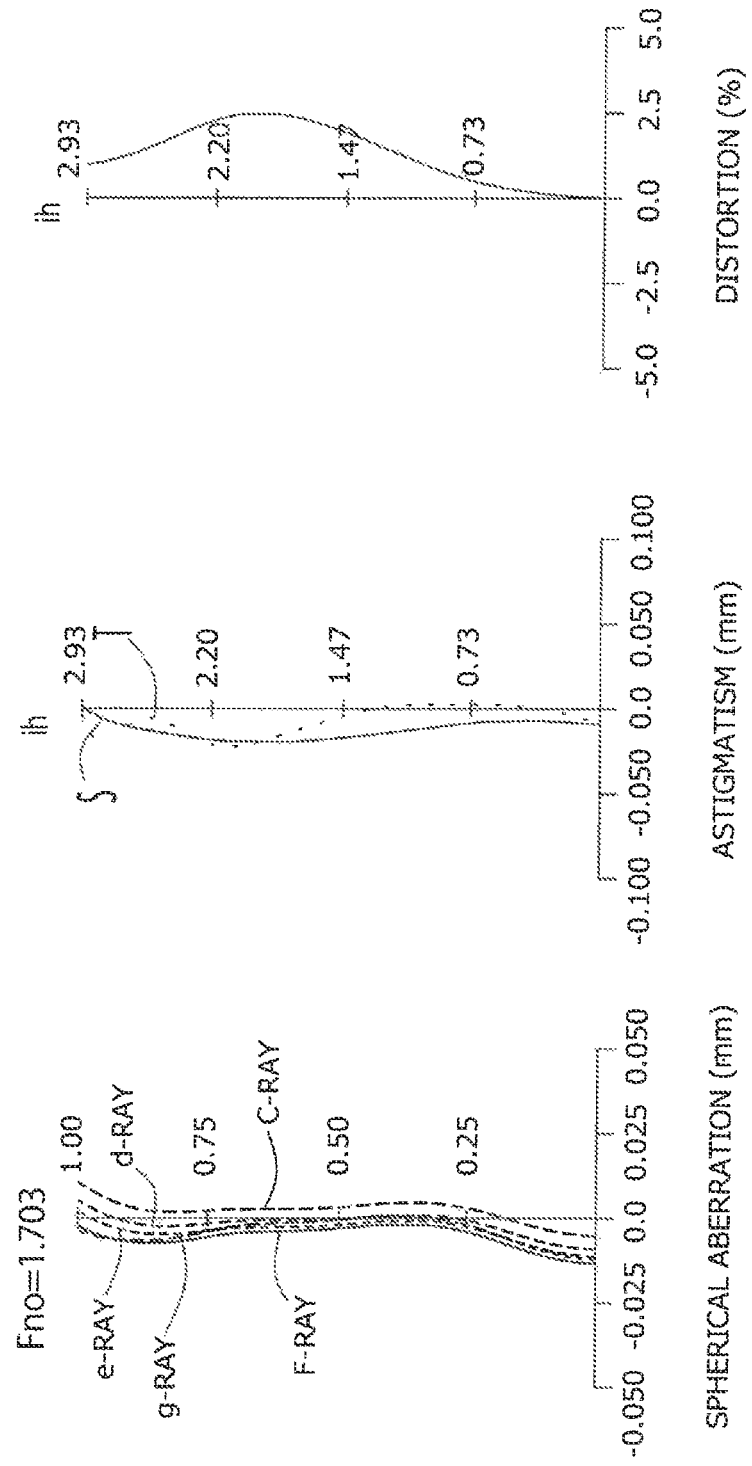
FIG. 22 shows spherical aberration, astigmatism and distortion of the imaging lens according to Embodiment 11.

FIG. 22 shows aberrations of the imaging lens in Embodiment 11. As FIG. 22 indicates, aberrations are properly corrected.

It can be understood that in the imaging lenses according to the aforementioned embodiments of the present invention, the total track length is as short as about 5.0 to 5.20 mm and the total track length to diagonal ratio is 0.9 or less, so they have a low-profile design though they are each composed of three lens groups (seven lenses). The F-number is in the range from 1.6 to 1.8, assuring high brightness; the total of view angle is 70 (degrees) or more, making it possible to take an image with a wide angle of view; and aberrations are corrected properly.

Table 12 shows data on Embodiments 1 to 11 relating to the conditional expressions (1) to (14).

TABLE 12

Parameter Data

| | Embodiment 1 | Embodiment 2 | Embodiment 3 | Embodiment 4 | Embodiment 5 | Embodiment 6 |
|---|---|---|---|---|---|---|
| Fno | 1.642 | 1.642 | 1.642 | 1.767 | 1.701 | 1.701 |
| f | 4.059 | 4.048 | 4.065 | 4.064 | 4.065 | 4.065 |
| f1 | 3.239 | 3.279 | 3.300 | 3.424 | 3.232 | 3.231 |
| f2 | −4.915 | −5.284 | −4.943 | −8.761 | −5.714 | −5.716 |
| f12 | 6.322 | 6.145 | 6.615 | 4.891 | 5.686 | 5.685 |
| f34 | 6.498 | 6.584 | 6.390 | 4.071 | 7.001 | 7.004 |
| f567 | −7.595 | −7.054 | −7.671 | −2.818 | −8.290 | −6.283 |
| TLA | 5.035 | 5.033 | 5.036 | 5.123 | 5.041 | 5.041 |
| ih | 2.934 | 2.934 | 2.934 | 2.934 | 2.934 | 2.934 |
| Σd | 4.183 | 4.160 | 4.204 | 4.275 | 4.161 | 4.181 |
| bf | 0.853 | 0.873 | 0.832 | 0.848 | 0.879 | 0.879 |

| | Embodiment 7 | Embodiment 8 | Embodiment 9 | Embodiment 10 | Embodiment 11 |
|---|---|---|---|---|---|
| Fno | 1.751 | 1.643 | 1.644 | 7.700 | 1.703 |
| f | 4.045 | 4.065 | 4.066 | 4.259 | 4.065 |
| f1 | 3.152 | 3.320 | 3.243 | 3.253 | 3.418 |
| f2 | −4.398 | −5.081 | −4.809 | −4.829 | −6.029 |
| f12 | 6.984 | 6.469 | 6.535 | 6.564 | 6.011 |
| f34 | 5.008 | 6.379 | 6.329 | 6.181 | 6.944 |
| f567 | −5.961 | −7.219 | −7.314 | −7.127 | −8.047 |
| TLA | 5.135 | 5.041 | 5.042 | 5.040 | 5.160 |
| ih | 2.934 | 2.934 | 2.934 | 2.934 | 2.934 |
| Σd | −4.258 | 4.187 | 4.190 | 4.188 | 4.183 |
| bf | 0.877 | 0.854 | 0.853 | 0.852 | 0.977 |

Data Relating to the Conditional Expressions

| | Embodiment 1 | Embodiment 2 | Embodiment 3 | Embodiment 4 | Embodiment 5 | Embodiment 6 |
|---|---|---|---|---|---|---|
| (1) 45 < vd1 < 70 | 56.16 | 56.16 | 56.16 | 56.16 | 56.16 | 56.16 |
| (2) 20 < vd2 < 35 | 23.91 | 23.91 | 23.91 | 23.91 | 23.91 | 23.91 |
| (3) 1.66 < vd1/vd2 < 2.66 | 2.35 | 2.35 | 2.35 | 2.35 | 2.35 | 2.35 |

TABLE 12-continued

| | | | | | | |
|---|---|---|---|---|---|---|
| (4) $20 < vd5 < 35$ | 23.91 | 23.91 | 23.91 | 23.91 | 23.91 | 23.91 |
| (5) $45 < vd6 < 70$ | 56.16 | 56.16 | 56.16 | 56.16 | 56.16 | 56.16 |
| (6) $1.66 < vd6/vd5 < 2.66$ | 2.35 | 2.35 | 2.35 | 2.35 | 2.35 | 2.35 |
| (7) $0.62 < f1/f < 1.01$ | 0.798 | 0.812 | 0.815 | 0.842 | 0.795 | 0.794 |
| (8) $-2.58 < f2/f < -0.87$ | -1.211 | -1.308 | -1.217 | -2.153 | -1.405 | -1.405 |
| (9) $0.96 < f12/f < 2.07$ | 1.558 | 1.521 | 1.630 | 1.202 | 1.398 | 1.398 |
| (10) $0.65 < f12/f34 < 1.67$ | 0.973 | 0.933 | 1.035 | 1.201 | 0.812 | 0.812 |
| (11) $-2.37 < f567/f < -0.55$ | -1.871 | -1.746 | -1.890 | -0.693 | -1.547 | -1.545 |
| (12) $0.77 < TLA/(2\ ih) < 1.0$ | 0.858 | 0.858 | 0.858 | 0.873 | 0.859 | 0.859 |
| (13) $0.78 < \Sigma d/TLA < 0.85$ | 0.831 | 0.826 | 0.835 | 0.834 | 0.826 | 0.826 |
| (14) $0.15 < bf/TLA < 0.22$ | 0.169 | 0.174 | 0.165 | 0.166 | 0.174 | 0.174 |

| | Embodiment 7 | Embodiment 8 | Embodiment 9 | Embodiment 10 | Embodiment 11 |
|---|---|---|---|---|---|
| (1) $45 < vd1 < 70$ | 55.57 | 56.27 | 56.16 | 56.16 | 56.16 |
| (2) $20 < vd2 < 35$ | 30.13 | 23.25 | 23.91 | 23.91 | 23.91 |
| (3) $1.66 < vd1/vd2 < 2.66$ | 1.84 | 2.42 | 2.35 | 2.35 | 2.35 |
| (4) $20 < vd5 < 35$ | 23.91 | 23.91 | 30.13 | 23.25 | 23.91 |
| (5) $45 < vd6 < 70$ | 56.16 | 56.16 | 55.57 | 56.27 | 56.16 |
| (6) $1.66 < vd6/vd5 < 2.66$ | 2.35 | 2.35 | 1.84 | 2.42 | 2.35 |
| (7) $0.62 < f1/f < 1.01$ | 0.778 | 0.816 | 0.797 | 0.801 | 0.840 |
| (8) $-2.58 < f2/f < -0.87$ | -1.085 | -1.249 | -1.181 | -1.189 | -1.482 |
| (9) $0.96 < f12/f < 2.07$ | 1.724 | 1.590 | 1.605 | 1.616 | 1.478 |
| (10) $0.65 < f12/f34 < 1.67$ | 1.395 | 1.014 | 1.033 | 1.062 | 0.866 |
| (11) $-2.37 < f567/f < -0.55$ | -1.471 | -1.775 | -1.797 | -1.755 | -1.978 |
| (12) $0.77 < TLA/(2\ ih) < 1.0$ | 0.875 | 0.859 | 0.859 | 0.859 | 0.880 |
| (13) $0.78 < \Sigma d/TLA < 0.85$ | 0.829 | 0.831 | 0.831 | 0.831 | 0.811 |
| (14) $0.15 < bf/TLA < 0.22$ | 0.171 | 0.169 | 0.169 | 0.169 | 1.89 |

As explained so far, when the imaging lens composed of three lens groups (seven lenses) according to any of the aforementioned embodiments is used for an optical system built in a mobile terminal such as a mobile phone or smart phone, PDA (Personal Digital Assistant) or image pickup device mounted in a game console or the like, it provides both a high-performance camera function and a low-profile design.

The effects of the present invention are as follows.

According to the present invention, the imaging lens has a low-profile design with a very small F-number and corrects various aberrations properly and provides a relatively wide angle of view. In addition, by using plastic material for all the constituent lenses, the imaging lens can be mass-produced at low cost.

What is claimed is:

1. An imaging lens having an optical axis and a fixed focal length and which is configured to form an image of an object on a solid-state image sensor, comprising, in order from an object side to an image side of the imaging lens: a first lens group including, in order from the object side, a first lens and a second lens; a second lens group including, in order from the object side, a third lens having positive refractive power and at least one aspheric surface and a convex surface facing the object side near an optical axis and a convex surface facing the image side near the optical axis, and a fourth lens having at least one aspheric surface and a convex surface facing the image side near the optical axis; and a third lens group including, in order from the object side, a fifth lens having at least one aspheric surface, a sixth lens that is a double-sided aspheric lens, and a seventh lens having a concave surface facing the image side near the optical axis, wherein: an image-side surface of the seventh lens has an aspheric surface whose shape changes from concave to convex as a distance from the optical axis increases, and a F-number of the imaging lens is less than 2.0, and when f is an overall focal length of the imaging lens, and f2 is a focal length of the second lens, a conditional expression (8b) given below is satisfied:

$$-1.482 \leq f2/f < -0.87 \quad (8b),$$

wherein the imaging lens has a total of seven lenses.

2. The imaging lens according to claim 1, wherein when vd1 is an Abbe number of the first lens at d-ray and vd2 is an Abbe number of the second lens at d-ray, conditional expressions (1) and (2) given below are satisfied:

$$45 < vd1 < 70 \quad (1)$$

$$20 < vd2 < 35 \quad (2).$$

3. The imaging lens according to claim 1, wherein when vd5 is an Abbe number of the fifth lens at d-ray and vd6 is an Abbe number of the sixth lens at d-ray, conditional expressions (4) and (5) given below are satisfied:

$$20 < vd5 < 35 \quad (4)$$

$$45 < vd6 < 70 \quad (5).$$

4. The imaging lens according to claim 1, wherein when f12 is a composite focal length of the first lens group and f34 is a composite focal length of the second lens group, a conditional expression (10) given below is satisfied:

$$0.65 < f12/f34 < 1.67 \quad (10).$$

5. The imaging lens according to claim 1, wherein the first lens has positive refractive power and a convex surface facing the object side, the second lens has negative refractive power and a concave surface facing the image side near the optical axis, the fifth lens has negative refractive power and a concave surface facing the object side near the optical axis, the sixth lens has positive refractive power and a convex surface facing the image side near the optical axis, and the seventh lens has negative refractive power.

6. An imaging lens having an optical axis and a fixed focal length and which is configured to form an image of an object on a solid-state image sensor, comprising, in order from an object side to an image side of the imaging lens: a first lens group including, in order from the object side, a first lens having positive refractive power and a convex surface facing the object side and a convex surface facing the image side and a second lens; a second lens group including, in order from the object side, a third lens having at least one aspheric surface and a convex surface facing the object side and a fourth lens having at least one aspheric surface and a convex surface facing the image side; and a third lens group having negative composite refractive power and including, in order from the object side, a fifth lens having at least one aspheric surface, a sixth lens that is a double-sided aspheric lens, and a seventh lens having negative refractive power and a concave surface facing the image side near the optical axis, wherein: an image-side surface of the seventh lens has an aspheric surface whose shape changes from concave to convex as a distance from the optical axis increases, and when f is an overall focal length of the imaging lens and f567 is a composite focal length of the third lens group, a conditional expression (11b) given below is satisfied:

$$-1.547 \leq f567/f < -0.62 \quad (11b),$$

wherein the imaging lens has a total of seven lenses.

7. The imaging lens according to claim 6, wherein when vd1 is an Abbe number of the first lens at d-ray and vd2 is an Abbe number of the second lens at d-ray, conditional expressions (1) and (2) given below are satisfied:

$$45 < vd1 < 70 \quad (1)$$

$$20 < vd2 < 35 \quad (2).$$

8. The imaging lens according to claim 6, wherein when vd5 is an Abbe number of the fifth lens at d-ray and vd6 is an Abbe number of the sixth lens at d-ray, conditional expressions (4) and (5) given below are satisfied:

$$20 < vd5 < 35 \quad (4)$$

$$45 < vd6 < 70 \quad (5).$$

9. The imaging lens according to claim 6, wherein when f is an overall focal length of the imaging lens, f1 is a focal length of the first lens, and f2 is a focal length of the second lens, conditional expressions (7) and (8) given below are satisfied:

$$0.62 < f1/f < 1.01 \quad (7)$$

$$-2.58 < f2/f < -0.87 \quad (8).$$

10. The imaging lens according to claim 6, wherein when f is an overall focal length of the imaging lens and f12 is a composite focal length of the first lens group, a conditional expression (9) given below is satisfied:

$$0.96 < f12/f < 2.07 \quad (9).$$

11. The imaging lens according to claim 6, wherein when f12 is a composite focal length of the first lens group and f34 is a composite focal length of the second lens group, a conditional expression (10) given below is satisfied:

$$0.65 < f12/f34 < 1.67 \quad (10).$$

12. The imaging lens according to claim 6, wherein the second lens has negative refractive power and a concave surface facing the image side near the optical axis, the fifth lens has negative refractive power and a concave surface facing the object side near the optical axis, the sixth lens has positive refractive power and a convex surface facing the image side near the optical axis, and the seventh lens has negative refractive power.

13. The imaging lens according to claim 1, wherein when f is an overall focal length of the imaging lens, f1 is a focal length of the first lens, and f2 is a focal length of the second lens, conditional expressions (7) and (8) given below are satisfied:

$$0.62 < f1/f < 1.01 \quad (7)$$

$$-2.58 < f2/f < -0.87 \quad (8).$$

14. The imaging lens according to claim 1, wherein when f is an overall focal length of the imaging lens and f12 is a composite focal length of the first lens group, a conditional expression (9) given below is satisfied:

$$0.96 < f12/f < 2.07 \quad (9).$$

* * * * *